(12) United States Patent
Brewer

(10) Patent No.: US 8,667,917 B2
(45) Date of Patent: Mar. 11, 2014

(54) WATERCRAFT, WATER DIVERTER, ENTANGLEMENT SYSTEM, AND DEFENSE SYSTEM FOR WATERCRAFT

(75) Inventor: Scott Brewer, St. Augustine, FL (US)

(73) Assignee: International Maritime Security Corporation, Springfield, VA (US)

(*) Notice: Subject to any disclaimer, the term of this patent is extended or adjusted under 35 U.S.C. 154(b) by 0 days.

(21) Appl. No.: 12/879,307

(22) Filed: Sep. 10, 2010

(65) Prior Publication Data
US 2011/0174140 A1 Jul. 21, 2011

Related U.S. Application Data

(60) Provisional application No. 61/241,267, filed on Sep. 10, 2009.

(51) Int. Cl.
*B63G 9/04* (2006.01)
(52) U.S. Cl.
USPC ............................................................ 114/14
(58) Field of Classification Search
USPC ............ 114/343, 9, 10, 14, 271, 274; 440/39, 440/42
See application file for complete search history.

(56) References Cited

U.S. PATENT DOCUMENTS

| 2,395,056 | A |   | 2/1946  | Luby |
|-----------|---|---|---------|------|
| 2,940,091 | A | * | 6/1960  | Fifer ................................ 441/71 |
| 2,983,508 | A | * | 5/1961  | Modine .......................... 472/128 |
| 3,198,158 | A |   | 8/1965  | Winter |
| 3,680,161 | A |   | 8/1972  | Bladh |
| 3,842,772 | A | * | 10/1974 | Lang ........................... 114/61.14 |
| 4,117,256 | A |   | 9/1978  | Williams |
| 4,597,352 | A | * | 7/1986  | Norminton ..................... 114/254 |
| 4,599,352 | A |   | 7/1986  | Narayanan et al. |
| 5,061,214 | A |   | 10/1991 | Monaghan |
| 5,171,101 | A |   | 12/1992 | Sauerbier et al. |
| 5,664,910 | A |   | 9/1997  | Lochtefeld et al. |

(Continued)

FOREIGN PATENT DOCUMENTS

| DE | 2160296 | 6/1973 |
| EP | 1505326 | 2/2005 |

(Continued)

OTHER PUBLICATIONS

Belgian Newspaper "De Standaard" of Tuesday Apr. 21, 2009. Section "Buitenland" p. 12. Article "Belgische kaptein overleefde kaping" section "Bescherming tegen piraterij" [XP00791206].

(Continued)

*Primary Examiner* — Stephen Avila
(74) *Attorney, Agent, or Firm* — Foley & Lardner LLP

(57) ABSTRACT

A watercraft includes a hull and a water diverter. The water diverter comprises at least one first deflector configured to direct water upward and outward from the hull of the watercraft to create a wave. The water diverter may include a support structure in the shape of a hollow tube for the first deflector, and a second deflector positioned above the first deflector. An entanglement system for defending watercraft includes a main cable attached to the watercraft and at least one strand section. Each strand section includes a connector and a plurality of strands attached to the connector, and each strand section is attached to the main cable. A defense system for watercraft can include both a water diverter and an entanglement system.

20 Claims, 24 Drawing Sheets

(56) References Cited

U.S. PATENT DOCUMENTS

| | | | |
|---|---|---|---|
| 5,846,104 A * | 12/1998 | Corcoran | 440/39 |
| 5,860,766 A | 1/1999 | Lochtefeld et al. | |
| 5,911,190 A | 6/1999 | Lochtefeld et al. | |
| 5,966,877 A | 10/1999 | Hawes | |
| 6,105,527 A | 8/2000 | Lochtefeld et al. | |
| 6,158,375 A | 12/2000 | Stuart, Jr. | |
| 6,325,015 B1 | 12/2001 | Garcia et al. | |
| 6,394,016 B2 | 5/2002 | Swartout et al. | |
| 6,513,945 B1 | 2/2003 | Wyss et al. | |
| 6,591,774 B2 | 7/2003 | Metherell | |
| 6,877,456 B2 | 4/2005 | Metherell et al. | |
| 6,918,349 B2 | 7/2005 | Andersson et al. | |
| 6,964,069 B2 | 11/2005 | English et al. | |
| 7,165,502 B2 | 1/2007 | Pedersen et al. | |
| 7,441,511 B2 | 10/2008 | Farinella et al. | |
| 7,637,224 B1 | 12/2009 | Portmann et al. | |
| 7,975,639 B2 | 7/2011 | Bishop | |
| 8,176,867 B2 | 5/2012 | Gayton | |
| 2010/0029151 A1 | 2/2010 | Bishop | |
| 2010/0300346 A1 * | 12/2010 | Gayton | 114/382 |

FOREIGN PATENT DOCUMENTS

| | | |
|---|---|---|
| GB | 943933 | 12/1963 |
| NL | 1023932 | 1/2005 |
| NL | 2003307 | 2/2011 |
| NL | 2004068 | 2/2011 |
| NL | 2004591 | 2/2011 |
| WO | WO9930966 | 6/1999 |
| WO | WO2008/145328 | 12/2008 |
| WO | WO2011/014066 | 2/2011 |

OTHER PUBLICATIONS

ISR in PCT/US2010/048244, dated Nov. 4, 2010.

International Search Report and Written Opinion for PCT/US2010/048244, mailed Nov. 4, 2010.

Perry, Mark J. "Anti-Piracy Options," Encyclopedia Brittanica Blog, Apr. 17, 2009, http://www.britannica.com/blogs/2009/04/anti-piracy-options/, XP007912205.

Articles for the Sun Sentinel dated Jun. 2, 2009. (http://articles.sun-sentinel.com/2009-06-02/news/0906010523-1-cruise-ships-anti-pirate-pirates) Westmark P-trap Self protection measure against piracy.

Johnson, Linda M. "Research and Development Center Develops Cutting-Edge Applications to Help Coast Guard Achieve Missions," Delivering the Goods: News from the U.S. Coast Guard Acquitition, Jan. 2009, vol. 13, pp. 1-4, http://www.uscg.mil/acquistion/newsroom/pdf/cg9newsletterJan09.pdf.

P-Trap® Prototype on the North Sea, Westmark BV, P-Trap, www.westmarkbv.com/?id=130, retrieved Apr. 11, 2011.

Nemesis 5000 Product Data, Joint Non-Lethal Weapons Directorate, Non-Lethal Weapons Reference Book, Dec. 2009, http://safesolutions-usa.com/Links/NemisisData.html, retrieved Oct. 14, 2013.

* cited by examiner

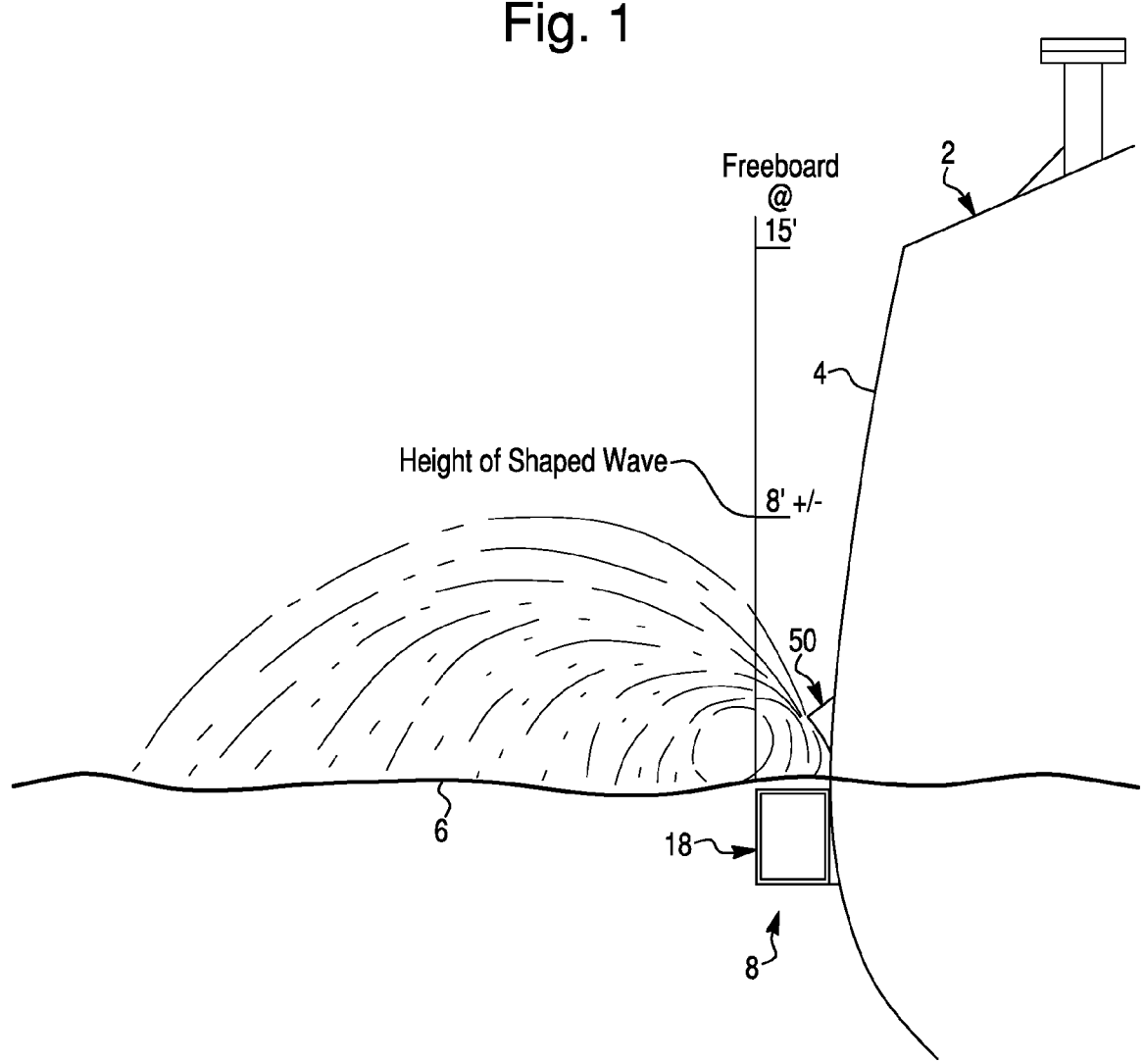

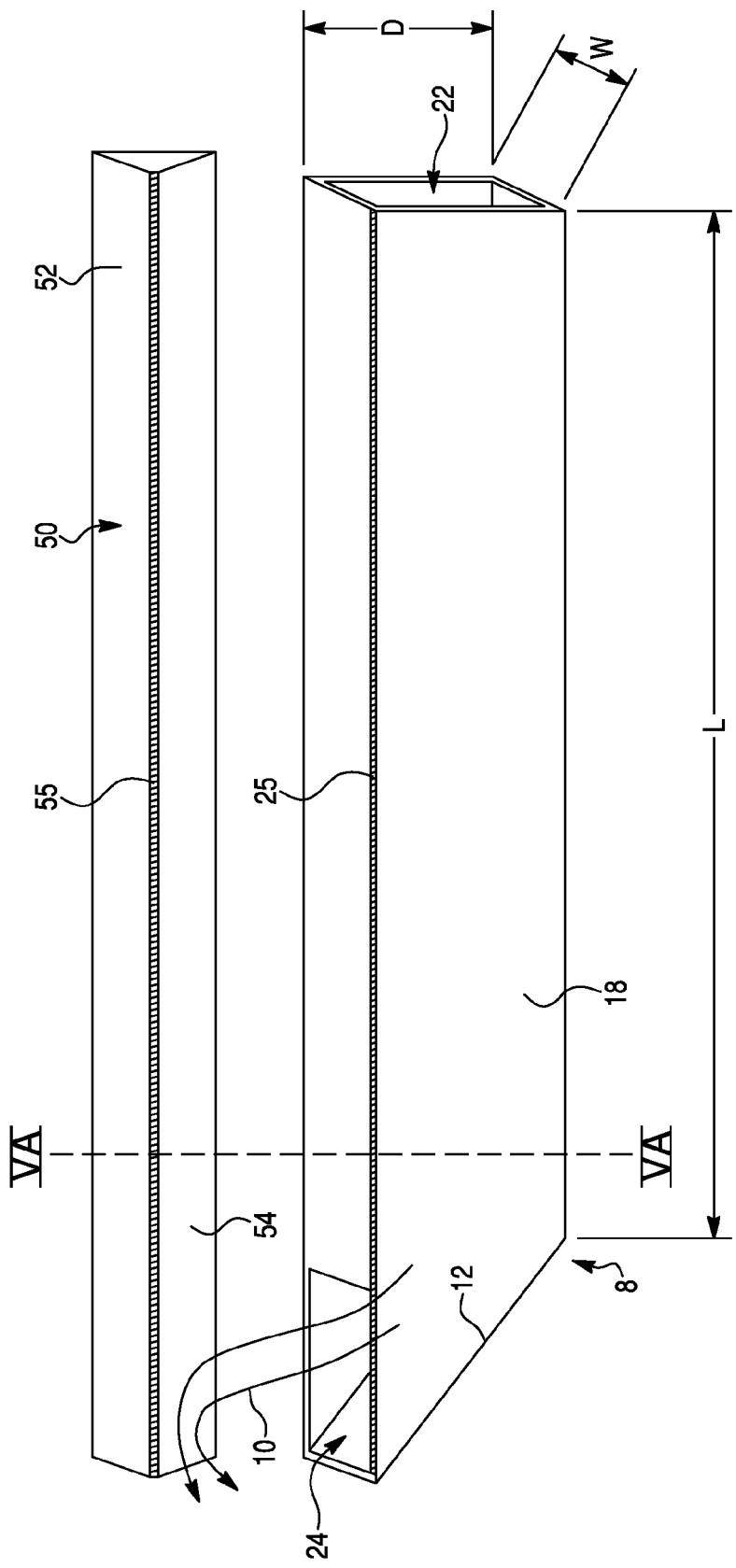

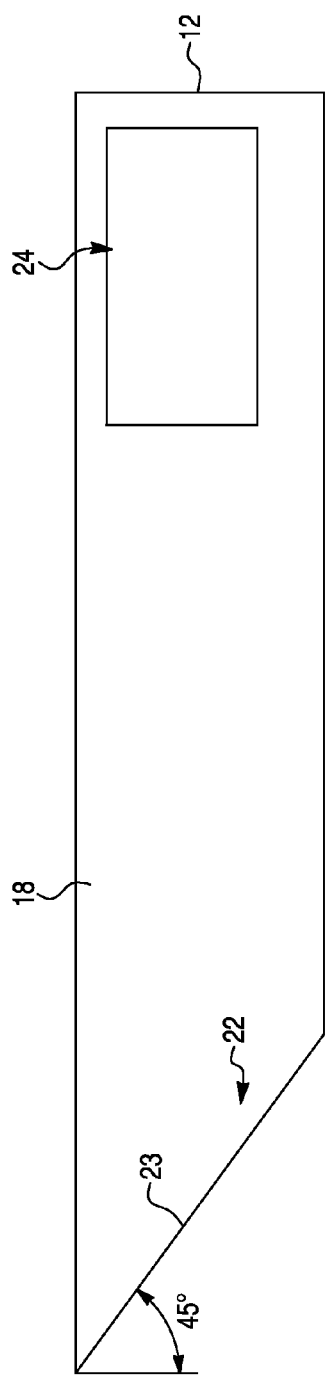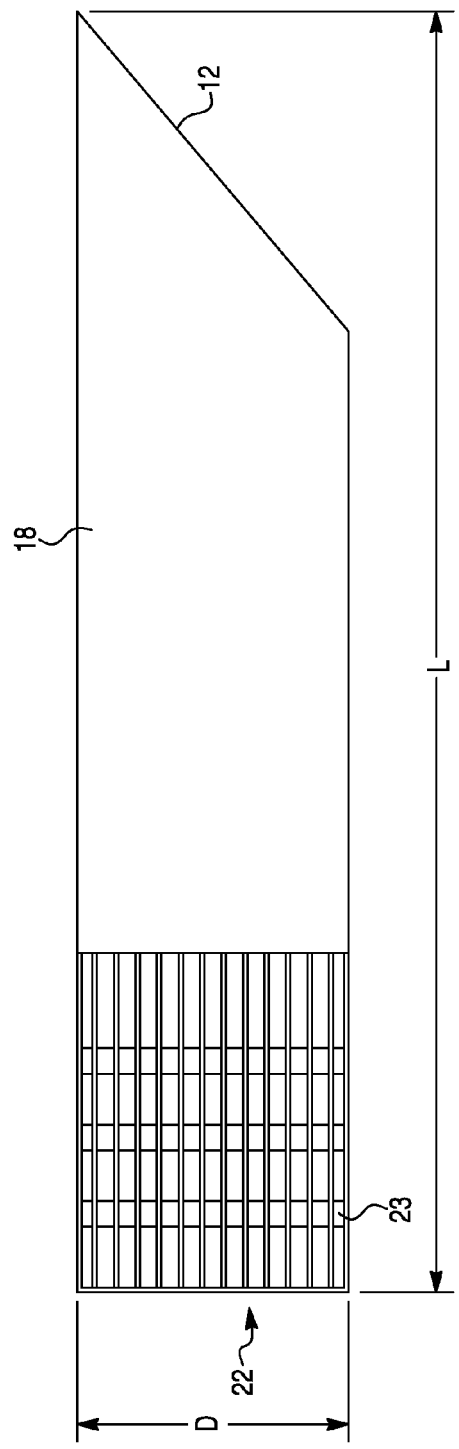

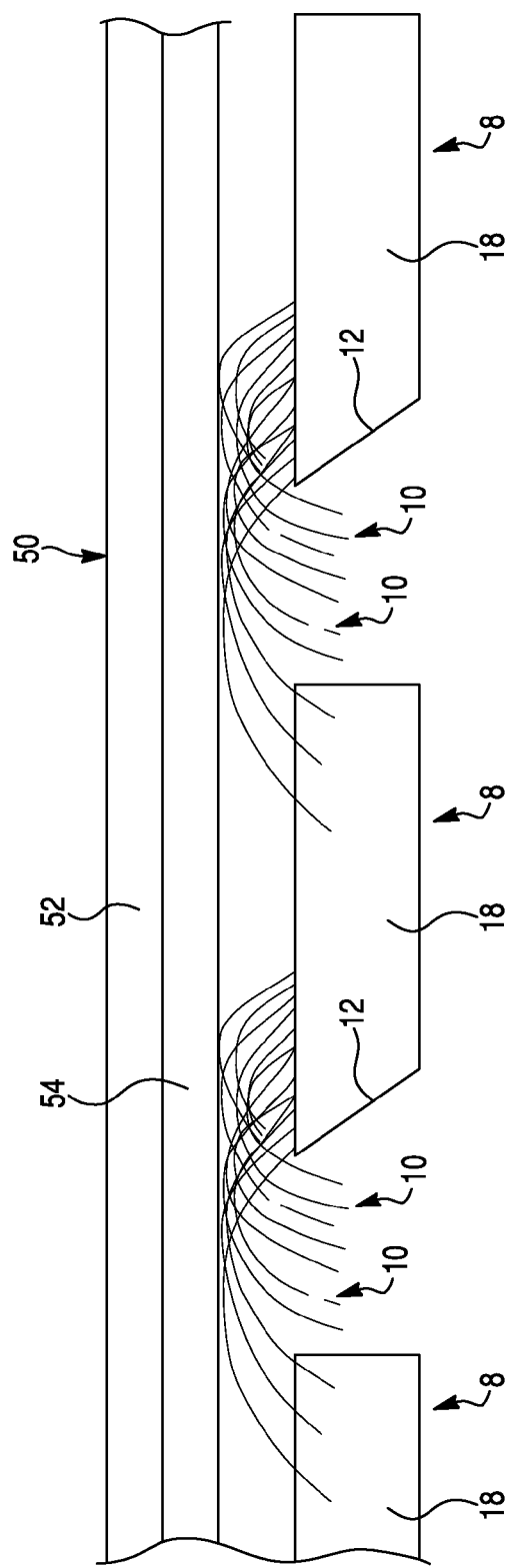

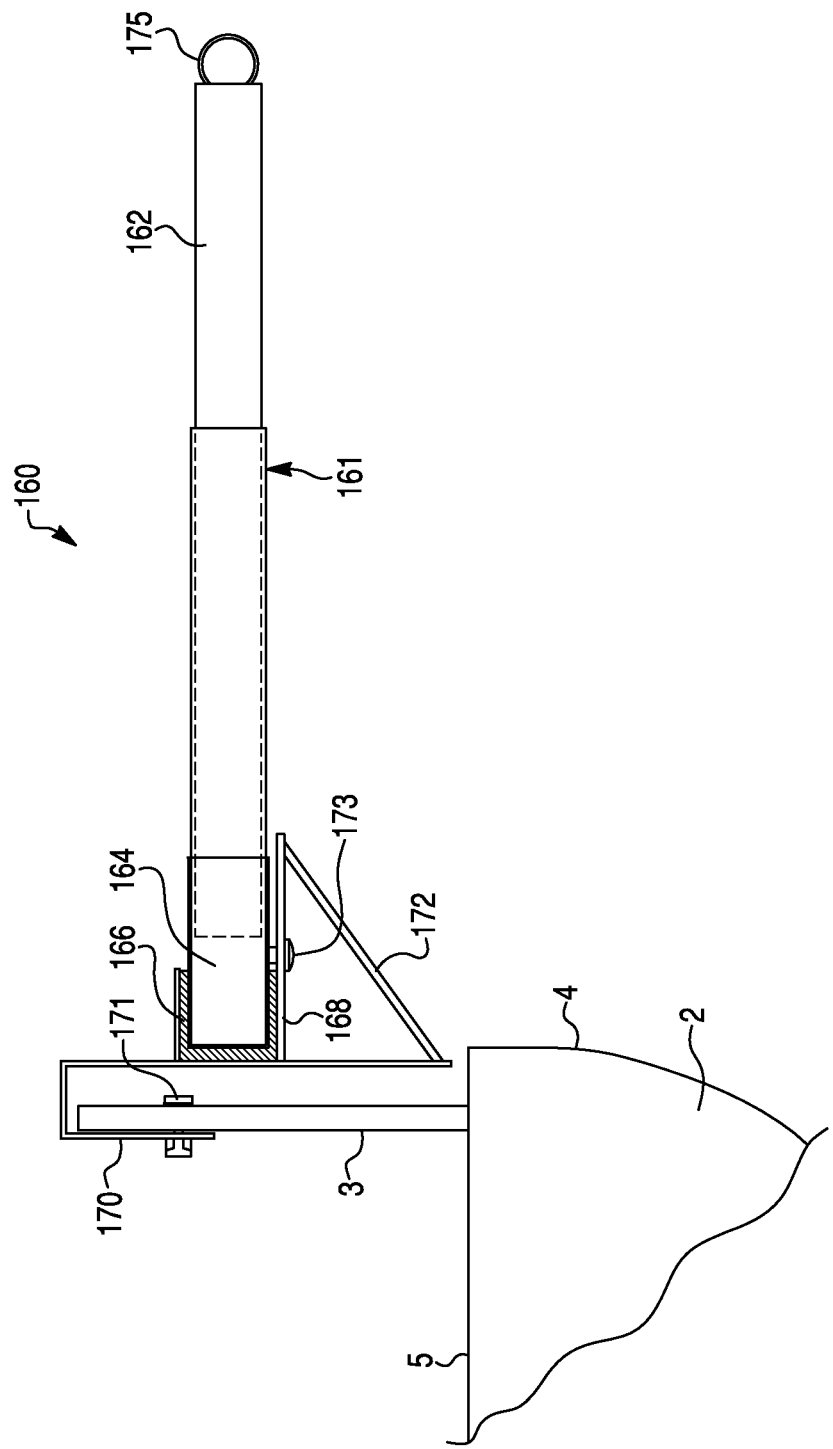

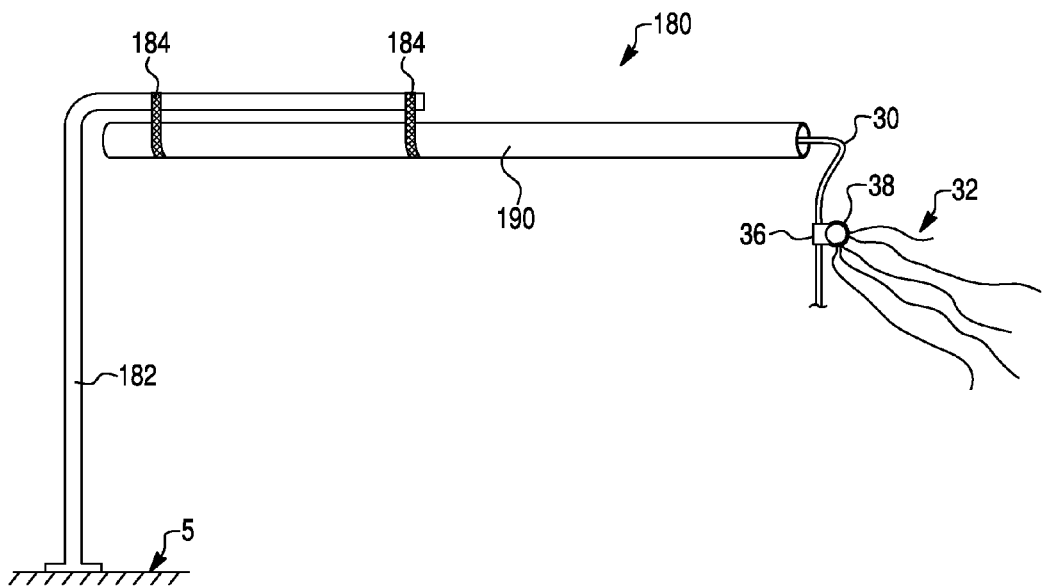
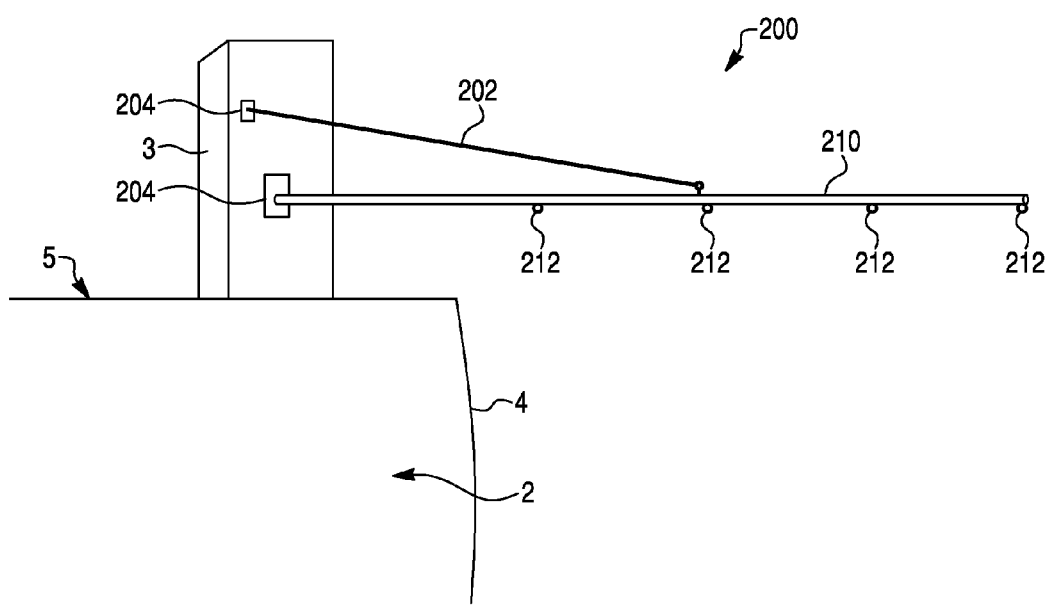

WATERCRAFT, WATER DIVERTER, ENTANGLEMENT SYSTEM, AND DEFENSE SYSTEM FOR WATERCRAFT

CROSS-REFERENCE TO RELATED PATENT APPLICATIONS

This application claims priority to U.S. Provisional Patent Application No. 61/241,267, filed Sep. 10, 2009, which is incorporated herein by reference in its entirety.

FIELD OF THE INVENTION

The present invention relates generally to the field of watercrafts and defense systems therefore.

BACKGROUND OF THE INVENTION

Piracy threatens the safety and security of those at sea and harms commerce. Shipping companies absorb vast amounts of losses each year when pirates steal their goods and/or watercraft. Pirates often use small skiffs or other open-top vessels to approach and board cargo ships at sea or port.

It is desirable to provide a defense system that can deter and prevent potential pirates from approaching and boarding cargo vessels and other watercraft. It is particularly desirable to provide devices that are simple, easy to use, and quick to deliver and install.

SUMMARY OF THE INVENTION

One embodiment of the invention relates to a watercraft that includes a hull and a water diverter. The water diverter is configured to direct water upward and outward from the hull of the watercraft to create a wave. The water diverter includes at least one first deflector configured to direct water upward and a support structure for holding the at least one first deflector. The support structure comprises a shell including a hollow tube for directing water. The hollow tube has at least one opening for the intake of water and at least one vent to allow water to exit the shell in an upward direction.

Another embodiment of the invention relates to an entanglement system for defending watercraft. The entanglement system comprises a main cable configured to be attached to a first watercraft and at least one strand section. Each strand section includes a connector and a plurality of strands attached to the connector. A first end of each of the plurality of strands is attached to the connector and a second end of each of the plurality of strands is a free end. Each strand section is attached to the main cable. The main cable and strand section are configured to be deployed into water surrounding the first watercraft to ensnare a propeller of a second watercraft.

Yet another embodiment of the invention relates to a deployment system for defending watercraft. The deployment system comprises an entanglement system and at least one of a boom, crane, gaff or davit configured to be mounted to a watercraft. The entanglement system comprises a main cable and a plurality of strands attached to the main cable. A first end of each of the plurality of strands is attached to the connector and a second end of each of the plurality of strands is a free end. The main cable is configured to extend down and into water surrounding the watercraft from the at least one of a boom, crane, gaff or davit.

Yet another embodiment of the invention relates to a defense system for watercraft with a hull. The defense system comprises a water diverter configured to direct water upward and outward from the hull of the watercraft to create a wave, and an entanglement system comprising a main cable and at least one strand section. Each strand section includes a connector and a plurality of strands attached to the connector. Each strand section is attached to the main cable.

Yet another embodiment of the invention relates to a defense system for watercraft with a hull. The defense system comprises a water diverter configured to direct water outward from the hull of the watercraft to create a water current extending away from the hull, and an entanglement system comprising a main cable and at least one strand section. Each strand section includes a connector and a plurality of strands attached to the connector. Each strand section is attached to the main cable.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is a rear view of an embodiment of a watercraft with a water diverter creating a shaped wave, according to the present invention.

FIG. 2 is a side view an embodiment of a water diverter with a first deflector and a second deflector.

FIG. 3A illustrates a first deflector with a steep incline. FIG. 3B illustrates a side view of a first deflector with a double-contour. FIG. 3C illustrates a top view of the first deflector with the double-contour of FIG. 3B. FIG. 3D illustrates a curved first deflector. FIG. 3E illustrates a first deflector positioned at an acute angle relative to the horizon.

FIGS. 4A-4B illustrate another embodiment of a water diverter that includes a screen. FIG. 4A illustrates a top view of the water diverter; and FIG. 4B illustrates a side view of the water diverter of FIG. 4A.

FIG. 5A is a cross-section view of the water diverter of FIG. 2 along line VA-VA, in which water flow is illustrated. FIG. 5B illustrates an alternative embodiment of the second deflector in which the plate has a 90 degree angle between a top surface and a bottom surface of the second deflector. FIG. 5C illustrates an alternative embodiment of the second deflector in which the bottom surface includes a sharp curve. FIG. 5D illustrates another embodiment of the second deflector in which the bottom surface includes a sweeping curve.

FIG. 6 is a side view of an embodiment of a watercraft with a plurality of water diverters, according to the present invention.

FIG. 12A illustrates a top view of the mounting plate. FIG. 12B illustrates a side view of the mounting plate of FIG. 12A.

FIG. 13A illustrates a watercraft without a water diverter; and FIG. 13B illustrates the watercraft of FIG. 13A with a water diverter.

FIG. 15A illustrates an embodiment of the entanglement system illustrating a plurality of strand sections on a cable. FIG. 15B illustrates a detail view of a strand section of another embodiment of the entanglement system. FIG. 15C is another illustration of an entanglement system. FIG. 15D illustrates a cable for the entanglement system, according to an embodiment.

FIG. 16A illustrates an entanglement system deployed through an anchor hawser; FIG. 16B illustrates an entanglement system deployed via a pneumatic spring or ballistic deployment; FIG. 16C illustrates an entanglement system deployed off the stern of the watercraft with a sea anchor; and FIG. 16D illustrates an entanglement system deployed via a crane or gaff.

FIG. 17A illustrates an embodiment of a telescoping boom assembly of a deployment system for an entanglement system.

FIG. 18 illustrates an embodiment of a davit boom assembly of a deployment system for an entanglement system.

FIG. 19 illustrates an embodiment of a boom assembly of a deployment system for an entanglement system.

DETAILED DESCRIPTION OF THE PREFERRED EMBODIMENTS

Figure 3A:
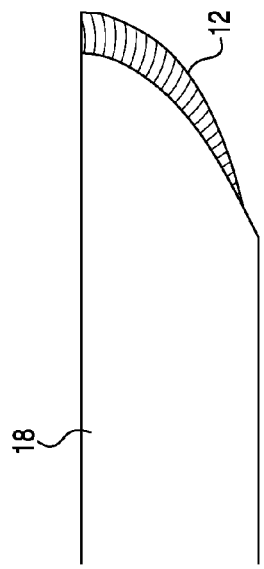
FIGS. 3A-3E illustrate alternative embodiments of the first deflector for the water diverter.

Presently preferred embodiments of the invention are illustrated in the drawings. An effort has been made to use the same or like reference numbers throughout the drawings to refer to the same or like parts.

I. The Water Diverter

FIG. 1 shows an embodiment of a water diverter 8 disposed on a hull 4 of a watercraft 2. The watercraft 2 may be any type of vessel used in water, such as a cargo ship, barge, boat, or cruise ship. The hull 4 can be any surface of a watercraft 2 that is in contact with water when the watercraft 2 is in water.

In a preferred embodiment, the water diverter 8 is attached to the hull 4 such that it can be positioned below the waterline 6. However, the diverter 8 may be attached to other portions of the watercraft 2 and may be placed in any position that allows it to direct water. As described below, the water diverter 8 can also be configured such that it is movable into and out of an operational or deflecting position.

Figure 7:
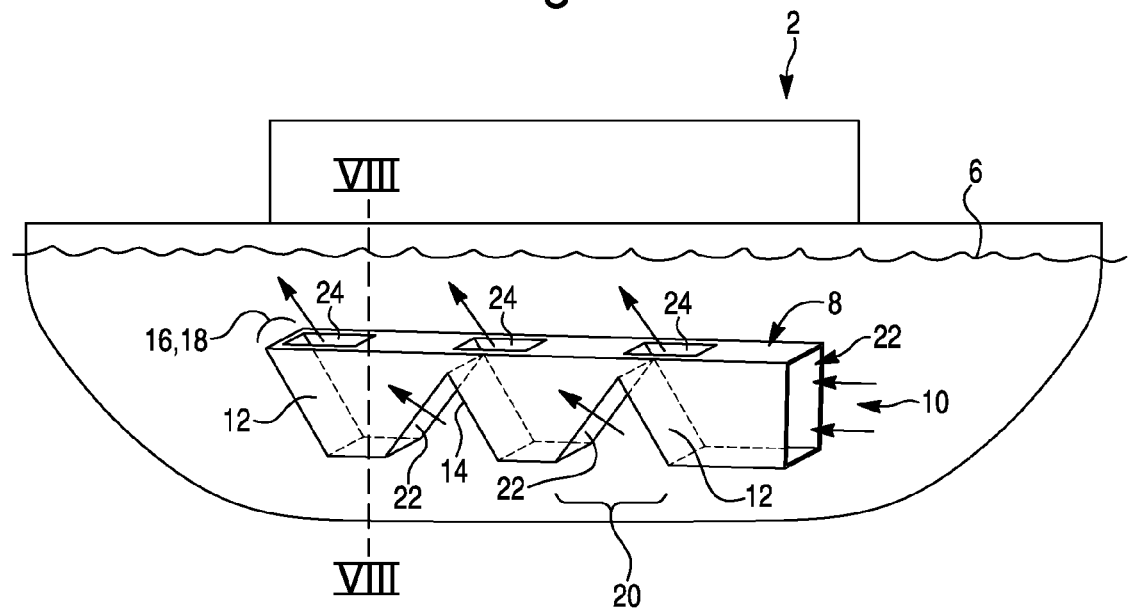
FIG. 7 shows an embodiment of a watercraft including a water diverter, according to the present invention.
Figure 13A:
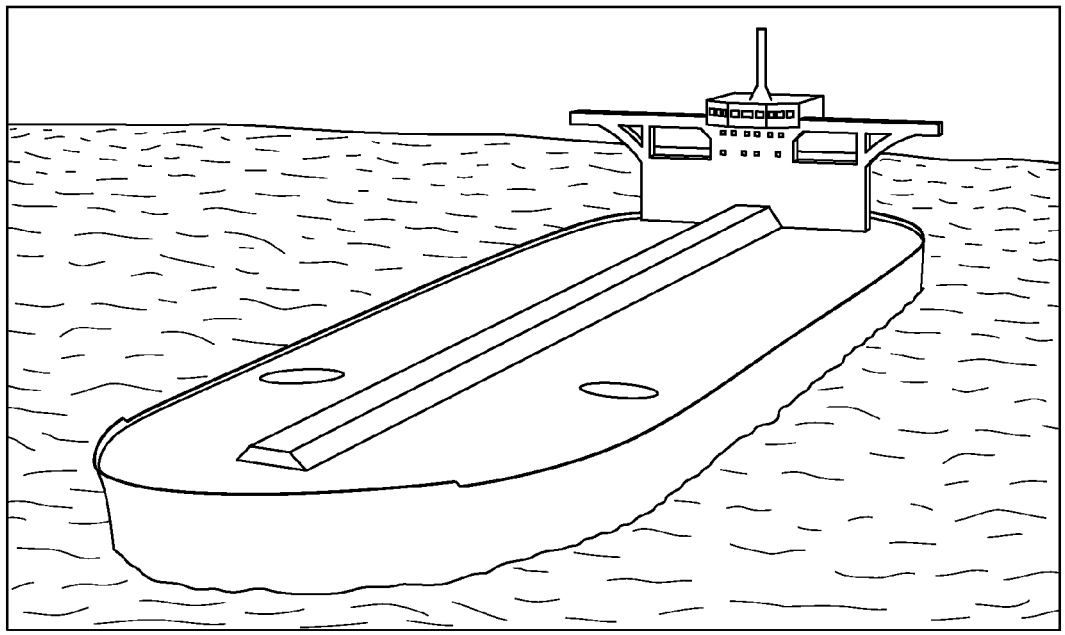
FIGS. 13A and 13B are photographs illustrating a watercraft according to an embodiment.
Figure 13B:
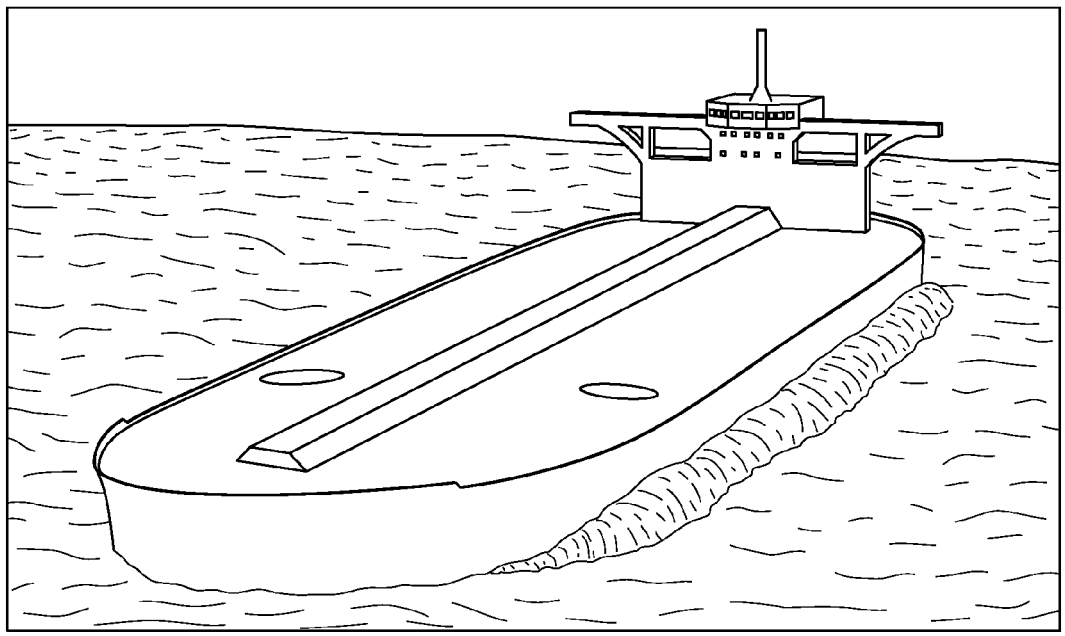

The diverter 8 preferably directs water 10 upward and outward from the hull 4 of the watercraft 2 to enhance the wake of the watercraft 2 and preferably create a wave directed at least partially outward from the watercraft 2, such as shown in FIGS. 1 and 13B. As an exemplary comparison, FIG. 13A illustrates the watercraft 2 without the waves created by a diverter 8. The diverter 8 is configured as a vented tube into which water 10 flows as the result of movement of the watercraft 2. This water 10 is put under pressure by a change in the flow angle and directed upward by a first deflector 12. In certain embodiments, the first deflector 12 alone can be configured to direct the water upward and outward to create a wave, such as shown in FIG. 7. In other embodiments, the first deflector 12 directs water primarily upward and a second deflector 50 is provided that is configured to further compress the flow of water 10 against the hull 4 and the second deflector 50 and direct the water outward so that a shaped wave flows outward from the hull 4, such as shown in FIG. 2.

The wake and/or wave is preferably large enough to physically prevent other vessels from approaching the hull 4 of the watercraft 2 closely enough to board the watercraft 2. For example, the wave can reach eight feet. Alternatively, the waves can reach higher or lower than eight feet. In another embodiment, the wave can reach approximately four feet to eight feet in height. In a preferred embodiment, the water diverter 8 directs water while the watercraft 2 is moving through the water. However, it is also possible for the diverter 8 to direct water while the watercraft 2 is stationary by using a hose or other pressurized water source to create an artificial current through the diverter 8.

The diverter 8 comprises at least one first deflector 12 for directing water 10. In an alternative embodiment, the diverter 8 comprises a plurality of first deflectors 12, such as shown in FIG. 7. The first deflector 12 is configured to direct water upward and/or outward from the hull 4. As shown in FIG. 7, the water diverter 8 includes only the first deflector 12, which is configured to direct the water upward and outward from the hull 4. Although FIG. 7 illustrates a plurality of first deflectors 12, a single first deflector 12 may be used. When the first deflector 12 is used in combination with the second deflector 50, the first deflector 12 is configured to direct water upward to the second deflector 50, which then directs water outward from the hull 4 to form a wave.

Each first deflector 12 is a solid piece of material with a surface 14 (FIG. 7) that preferably directs the intake water 10 upward and/or outward relative to the hull 4. The first deflector 12 can have a variety of dimensions, and may vary in size along each direction. The surface 14 can be any shape including triangular, square, rectangular, trapezoidal, etc. that allows it to effectively direct water 10. The surface 14 can also be planar or curved. For example, FIG. 2 illustrates the first deflector 12 having a flat surface 14.

Figure 3B:
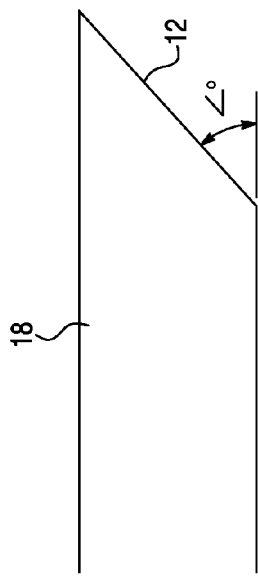
Figure 3C:
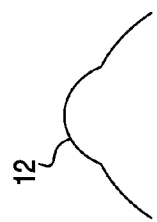
Figure 3D:
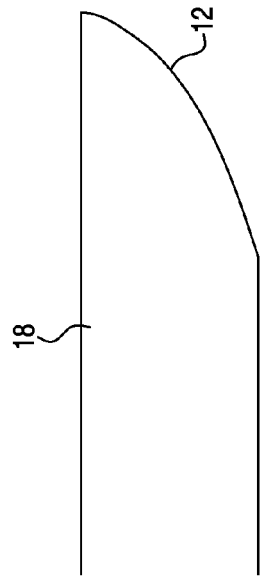
Figure 3E:
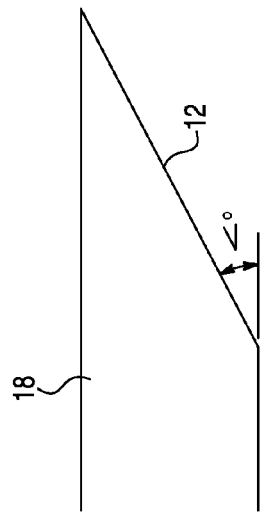

FIGS. 3A-3E illustrate alternative embodiments of the first deflector 12. For example, the first deflector 12 may be positioned at a steep angle, such as shown in FIG. 3A, to create a higher wave. The first deflector 12 may be positioned at an acute angle, such as shown in FIG. 3E, to provide a longer wave. The first deflector 12 may be curved, such as shown in FIG. 3C, to provide control over draft and water 10 flow. A curved first deflector 12 can increase the flow of water 10 through the diverter 8. The curvature of the first deflector 12 can vary. Alternatively, the first deflector 12 can have a double-contoured configuration, such as shown in FIGS. 3B and 3C. The double-contoured first deflector 12 can provide increased direction control to water 10 flow. The first deflector 12 shape can be varied to optimize wave length, height, direction, and/or shape. The configuration of the first deflector 12 is based on variables such as the size of the watercraft 2, weight, draft, speed, intended purpose, operational environment, or other factors.

The length of the waves created by the diverter 8 is dependent upon the speed of the watercraft 2. For example, the length of the waves has been found to be determined by the following formula: $(V \div 1.34)^2$, where V=speed of the watercraft 2.

The water diverter 8 comprises a support structure 16 (FIG. 7) configured to hold at least the first deflector 12. The support structure 16 may also be configured to hold the second deflector 50. The support structure 16 is fixedly or moveably connected to the hull 4 of the watercraft 2, or any other suitable portion of the watercraft 2.

In an embodiment, the first deflectors 12 are directly attached to the hull 4 by the support structure 16. The support structure 16 may be any structure configured to connect the first deflectors 12 to the hull 4, such as a single plank or a structure with a series of slots for first deflectors 12. The first deflectors 12 may attach to the support structure 16 by screws, bolts, welding, hinges, or any other appropriate fixed or movable attachment methods. Support structures 16 holding at least one first deflector 12 may be placed in a variety of configurations along the hull 4 of a watercraft 2. For example, they may be placed in single or multiple rows along the length of the watercraft 2, or they may be placed in select locations to create optimal wave forms.

In another preferred embodiment, the support structure 16 may comprise a shell 18 to hold at least the first deflector 12, as in FIGS. 1-11. The shell 18 can hold a single first deflector 12 or a plurality of first deflectors 12. In these embodiments, the shell 18 is generally a hollow tube or casing. The shell 18 may have any suitable length. In a preferred embodiment, the shell 18 is a long tube, such as a 10 foot long tube. During regular forward movement of a watercraft 2, the watercraft 2 will be moved up and down varying degrees depending upon the current and waves in the water 10. A longer shell 18 will produce a larger wave than a shorter shell 18, because the longer shell 18 will have more water 10 inside when the shell 18 moves up past the water line 6 during travel of the watercraft 2.

The volume of water 10 coming into the shell 18 determines the volume of water exiting the shell 18. The volume of the shell 18 will be varied depending on the size of the watercraft 2. The shell 18 and/or vent 24 will be sized (length, width, depth) according to the size of the watercraft 2 so that the shell 18 and vent 24 will not blow out or break at any watercraft 2 speed.

The cross-section of the shell 18 may be any shape, such as rectangular, circular, or triangular. In a preferred embodiment, the shell 18 comprises a rectangular cross-section.

The shell 18 comprises at least one opening 22 for the intake of water, as shown in FIG. 2. Once moving upward and outward, the water 10 exits the interior of the shell 18 through a vent 24. The intake 22 is positioned to face toward the direction of travel so that water 10 flows into the shell 18 and compresses against the first deflector 12 and moves upward and outward out of the vent 24. The vents 24 may be any shape and size to allow water 10 to effectively exit the shell 18 and continue to travel upward and/or outward. In a preferred embodiment, the diverter 8 comprises one first deflector 12 for each vent 24. However, the diverter 8 may comprise any suitable number of first deflectors 12 and vents 24. The vents 24 can have any suitable shape, such as a square, rectangular, or circular shape. In a preferred embodiment, the vents 24 have a square shape.

In a preferred embodiment, the shell 18 comprises a protective intake grate or screen 23 attached to the intake opening 22. The protective intake grate 23, such as shown in FIGS. 4A-4B, is configured to prevent fish, debris, or other unwanted objects out of the shell 18. The protective intake grate 23 is placed at an angle, such as a 45 degree angle, so that debris and foreign objects will tend to be swept away from the intake opening 22. The protective intake grate 23 material and angle may vary depending upon the configuration of the watercraft 2, operational environment, or other factors.

In a preferred embodiment, such as shown in FIG. 4B, the shell 18 is generally rectangular in shape. The shell 18 is approximately 20 feet long, five feet deep, and 1.5 feet wide. The vent 24 is generally rectangular in shape and approximately 80% the size of the intake opening 22.

Figure 5A:
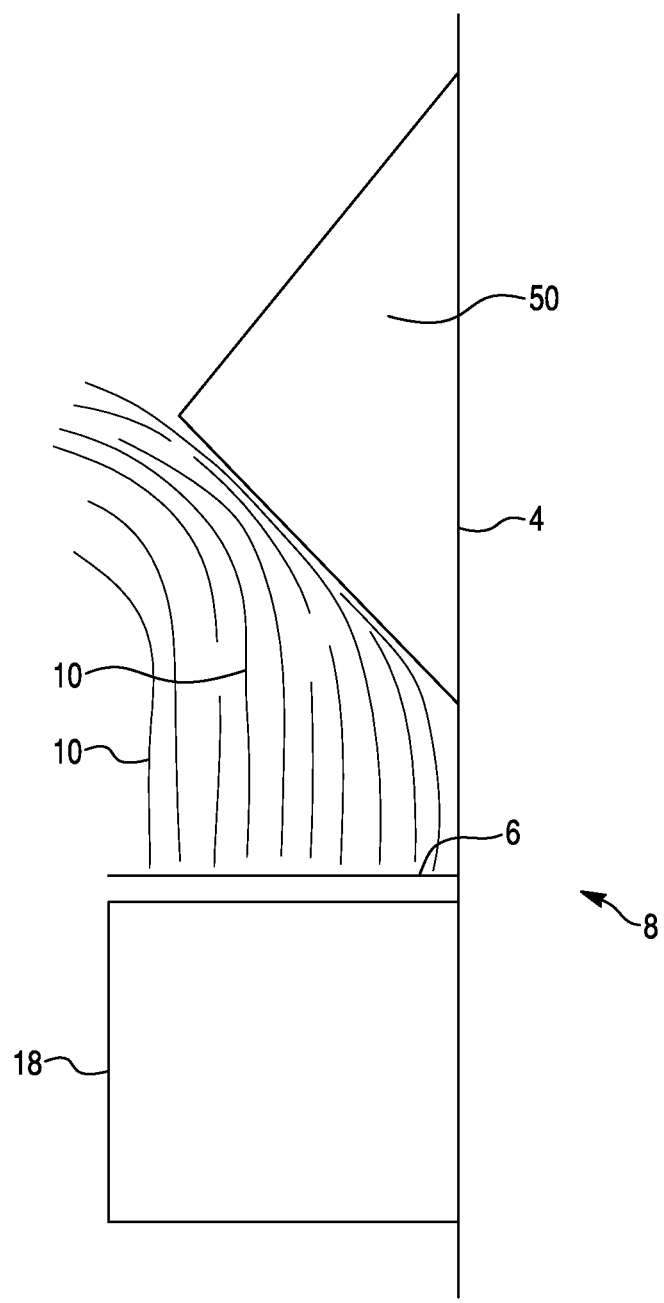
FIGS. 5A-5D illustrate alternative embodiments of a water diverter with a second deflector.

In another preferred embodiment, the diverter 8 may further comprise the second deflector 50. The second deflector 50 is configured to shape the wave as water 10 exits from the vent 24 at a high velocity. For example, FIGS. 2 and 5A illustrate the water 10 leaving the vent 24 and being deflected by the second deflector 50. The first deflector 12 is configured to deflect water 10 upward toward the second deflector 50. Water 10 exiting the shell 18 via the vent 24 is subjected to the venturi effect. The water 10 is then compressed between the hull 4 and the second deflector 50. This compression between the hull 4 and second deflector 50 shapes the outgoing wake into a curling wave deflected outward from the hull 4.

The second deflector 50 is positioned over the shell 18 to cover the entire water flow coming out of the vent 24. The second deflector 50 may be of any size or shape, based on the size of the vent 24 or other factors. The second deflector 50 may be shaped like a triangular or rectangular prism, or it may be irregularly shaped (e.g. curved, S-shaped, varying thickness along one dimension, etc.). The second deflector 50 comprises a top surface 52 and a bottom surface (or impact side) 54. The surfaces 52, 54 may be flat or curved. The second deflector 50, in a preferred embodiment, is positioned so that the top surface 52 is at a downward angle to prevent an intruder from using the top surface 52 as a step to gain entry to the watercraft 2.

Figure 5D:
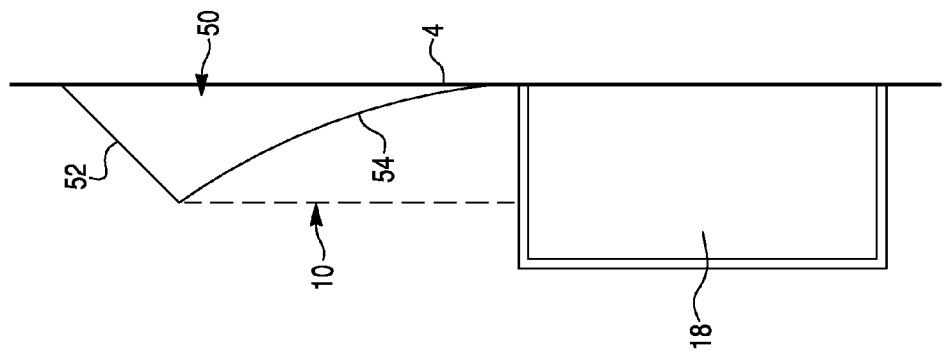
Figure 5C:
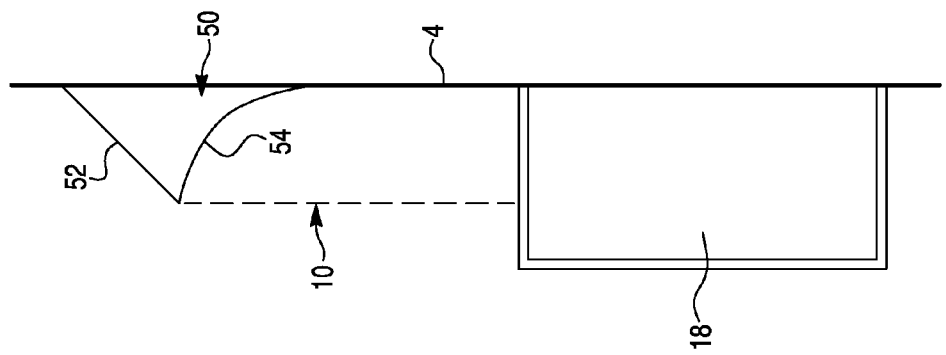
Figure 5B:
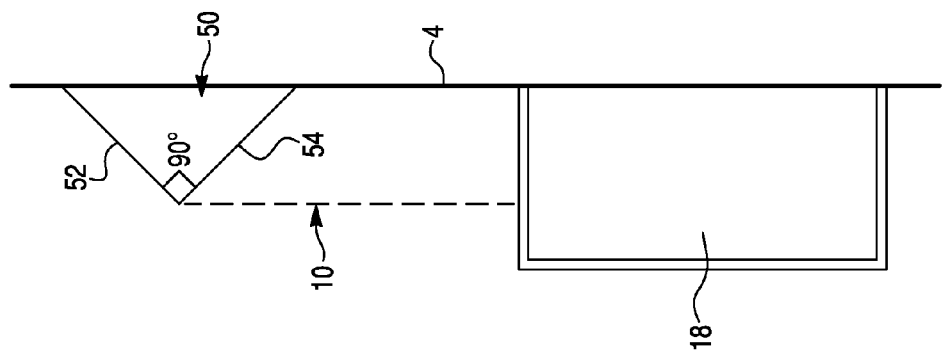

The second deflector 50 may be arranged in any suitable configuration. For example, the second deflector 50 may be configured so that the top surface 52 is positioned at a 90 degree angle to the bottom surface 54, such as shown in FIG. 5B. Alternatively, the bottom surface 54 may have a sharp curve, such as shown in FIG. 5C. In yet another embodiment, the bottom surface 54 may have a sweeping curve, such as shown in FIG. 5D. The variations in second deflector 50 cross-section, size, and shape can create different wave heights, breadth, and shape.

The shell 18 and second deflector 50 may each comprise teeth 25, 55, such as shown in FIG. 2. The teeth 25 are arranged on an outer edge of the shell 18. The teeth 55 are arranged on an outer edge of the second deflector 50, such as at the edge joining the top surface 52 and the bottom surface 54. The teeth 25, 55 are configured to damage small rafts or boats and to prevent or deter intruders from accessing the shell 18 and second deflector 50. The teeth 25, 55 can have any suitable size, shape, and configuration. In a preferred embodiment, the teeth 25, 55 are one inch by one inch in size, and extend for the entire length of the shell 18 and second deflector 50. The teeth 25, 55 may have a triangular or rectangular shape, or any other suitable shape.

In a preferred embodiment, the watercraft 2 comprises a plurality of diverters 8 with shells 18 and second deflectors 50. FIG. 6 illustrates a watercraft 2 with the plurality of diverters 8. The diverters 8 are arranged so that the waves overlap the adjoining diverter 8 to create larger waves. The number of diverters 8 and shells 18 depends on the size of the watercraft 2. The longer the watercraft 2, the more diverters 8 and/or shells 18 that will be used. As the watercraft 2 is moving forward through the water 10, the wave is thrown back from a forward diverter 8 over the rear adjoining diverter 8, which creates a turbulent, overlapping wave along the full length of the hull 4. In a preferred embodiment, the waves are configured to overlap by half of the following tube.

Figure 8:
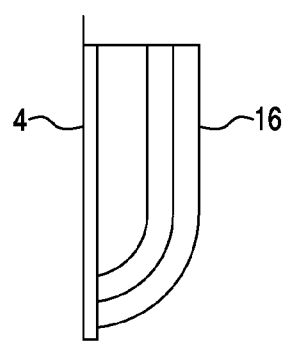
FIG. 8 is a cross-sectional view of the water diverter of FIG. 5 along line VIII-VIII.

FIG. 7 illustrates an embodiment in which the shell 18 comprises cutouts 20 to create first deflectors 12 and additional openings 22 for water intake. FIG. 8 shows a cross-sectional view along line VIII-VIII of the support structure 16 of FIG. 7, in which the shell 18 is cambered towards the hull 4 to assist intake flow. In the embodiment of FIG. 7, the shell 18 comprises a plurality of first deflectors 12, intake openings 22, and vents 24.

Figure 9:
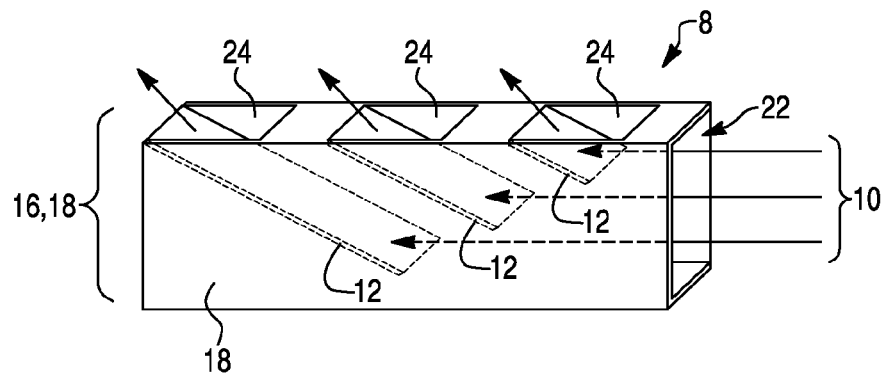
FIG. 9 shows is another embodiment of a water diverter, according to the present invention.
Figure 10:
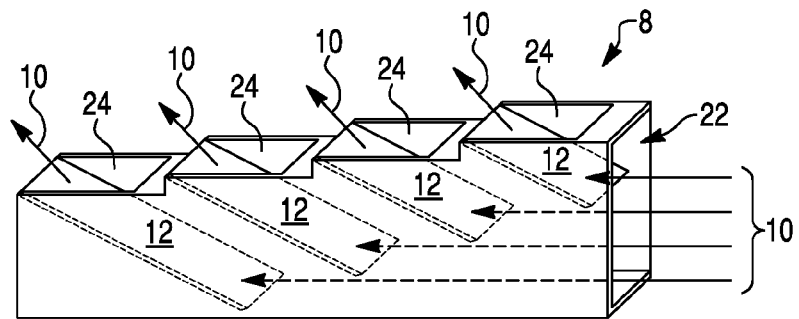
FIG. 10 shows another embodiment of a water diverter, according to the present invention.

FIG. 9 shows another embodiment of the water diverter 8 comprising three first deflectors 12, a shell 18, and vents 24. In this configuration, the vents 24 lie in substantially the same plane. In other words, in use, all water exiting the shell 18 would exit at approximately the same distance from the surface of the water to create a substantially uniform wave along the hull 4. In FIG. 10, the vents 24 of the water diverter 8 lie in different planes. The first deflectors 12 and shell 18 are arranged in a step-down system, so water exits the shell 18 at different levels with respect to the surface of water. This may create a wave that differs in size along its length.

Figure 11:
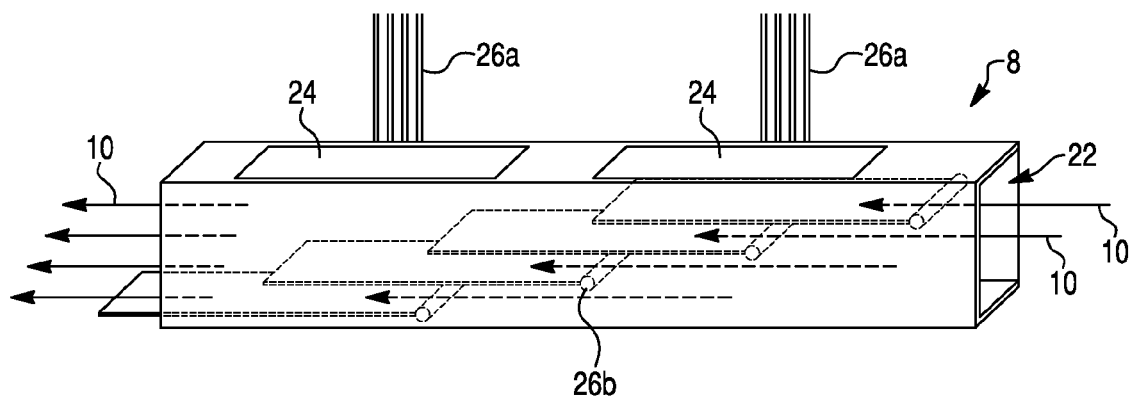
FIG. 11 shows another embodiment of a water diverter with moving structures configured to move first deflectors, according to the present invention.

In another preferred embodiment of the watercraft 2, the support structure 16 includes one or more moving structures to move the first deflectors 12 and/or the second deflectors 50 into an operational or deflecting position. FIG. 11 shows two configurations of moving structures 26a and 26b. The water diverter 8 may be provided with one or both of the moving structures 26a, 26b, although the water diverter 8 need not have a moving structure. In one configuration, the moving structure 26a comprises any system (e.g. rails) that causes the support structure 16 to move up and down along the hull 4. By moving the support structure 16 along the rails of the moving structure 26a, the first deflectors 12 are moved from a non-deflecting (e.g. out of the water) to a deflecting position (e.g. in the water). The moving structure 26a may be operated by any appropriate mechanism and may be, for example, hydraulic or geared rails. Although not shown, the second deflectors 50 may also be connected to the moving structure 26a so that the second deflectors 50 move from a non-deflecting to a deflecting position with the first deflectors 12. The second deflectors 50 may also be connected to the moving structure 26a so that the second deflectors 50 move relative to the first deflectors 12 to adjust the distance between the first deflector 12 and second deflector 50.

Figure 12B:
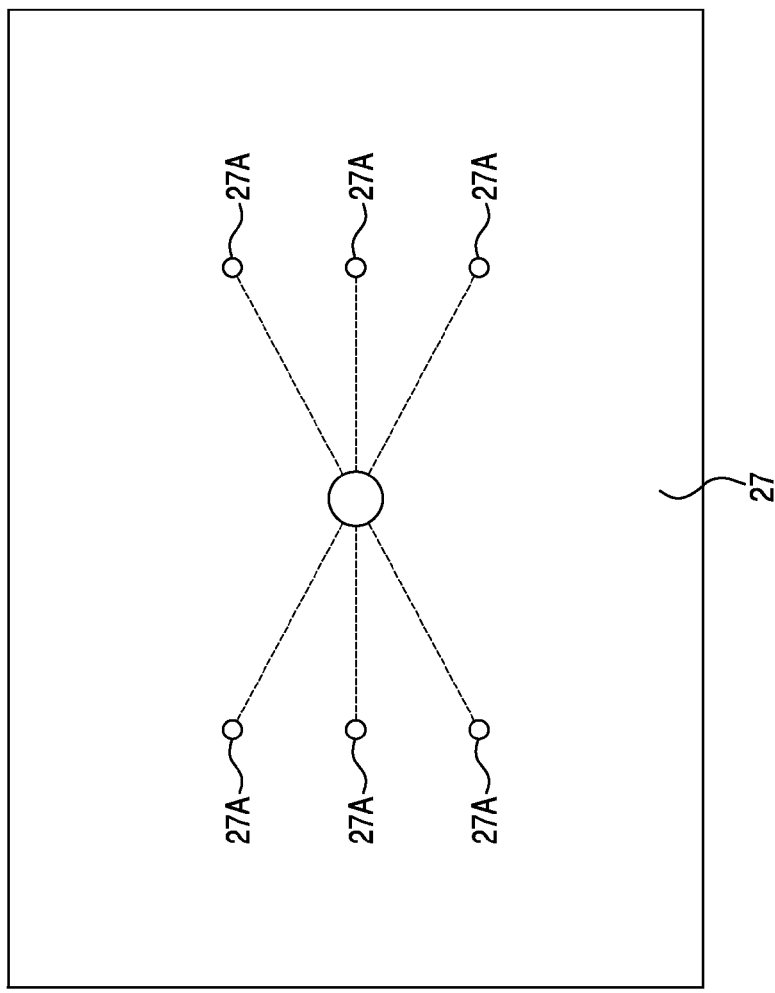
FIGS. 12A-12B illustrate an embodiment of a mounting plate for a water diverter.
Figure 12A:
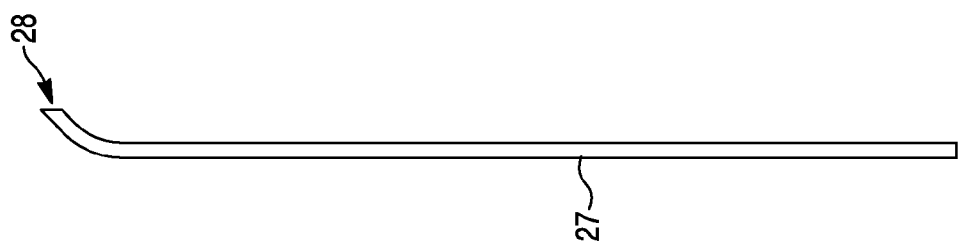

The second deflector 50 may be separate from the shell 18, or may be attached to the shell 18. In a preferred embodiment, the second deflector 50 and shell 18 may be integrally joined to a single plate, such as the mounting plate 27 shown in FIG. 12A. For example, the second deflector 50 and shell 18 may be attached to the moving structure 26a via the mounting plate 27. The water diverter 8 is attached to the mounting plate 27 by mounting the moving structure (rails) 26a to the mounting plate 27 at mounting locations 27A. With the water diverter 8 connected to the mounting plate 27 and rails of the moving structure 26a, the water diverter 8 can be lifted out of the water 10 when not in use by moving the mounting plate 27 up the rails of the moving structure 26a. The water diverter 8 can then be lowered into the water 10 by lowering the mounting plate 27 down along the rails of the moving structure 26a.

A leading end or edge 28 of the mounting plate 27 is curved toward the hull 4 of the watercraft 2. This curved leading end 28 can reduce pressure on the inward (hull 4 side) surface of the mounting plate 27, which will pull the whole assembly of the water diverter 8 and mounting plate 27 toward the hull 4 via a vacuum, and can reduce wobble and vibration of the mounting plate 27.

In further exemplary embodiments, the water diverter 8 can be deployed by different configurations of the moving structures 26a. For example, the moving structure 26a can comprise cables, gears, a chain drive, rails (as discussed above), or other leverage-based lifting and lowering methods to raise and lower the water diverter 8. In a further example, the moving structure 26a can comprise one or more hydraulic lines that run from the deck 5 of the watercraft 2 or some other portion of the watercraft 2. The moving structure 26a may further include one or more electric motors. The electric motors are secured to the deck 5, some other portion of the watercraft 2, some other component of the moving structure 26a (e.g., rails, etc.) or to the diverter 8 to drive the diverter 8 up and down the side of the watercraft 2 via the rails, gears, chains, cable or other component of the moving structure 26a. It will be recognized that one or more moving structures 26a, or combinations of moving structures 26a may be used.

In a preferred embodiment, the second deflector 50 is configured to be movable relative to the shell 18 (and thus the first deflector 12). For example, the second deflector 50 can be connected to the moving structure (rails) 26a separate from the shell 18. Configuring the second deflector 50 to be movable relative to the shell 18 enables the water diverter 8 to accommodate changes in water flow due to changes in the speed of the watercraft 2. The speed of the watercraft 2 will affect the volume of the water flow. For example, during slower speeds, the second deflector 50 may be arranged closer to the shell 18 (and thus the first deflector 12) then at faster speeds.

A configuration of the moving structure 26b, shown in FIG. 11, comprises a louver system to move individual first deflectors 12. The moving structure 26b may be any system that adjusts the orientation of the first deflectors 12. The support structure 16 may remain stationary while the first deflectors 12 shift from a non-deflecting position (e.g. in line with the flow of water, as shown in FIG. 11) to a deflecting position (e.g. in a position to direct the flow of water, as shown in FIG. 9) and vice versa.

II. The Entanglement System

Figure 14:
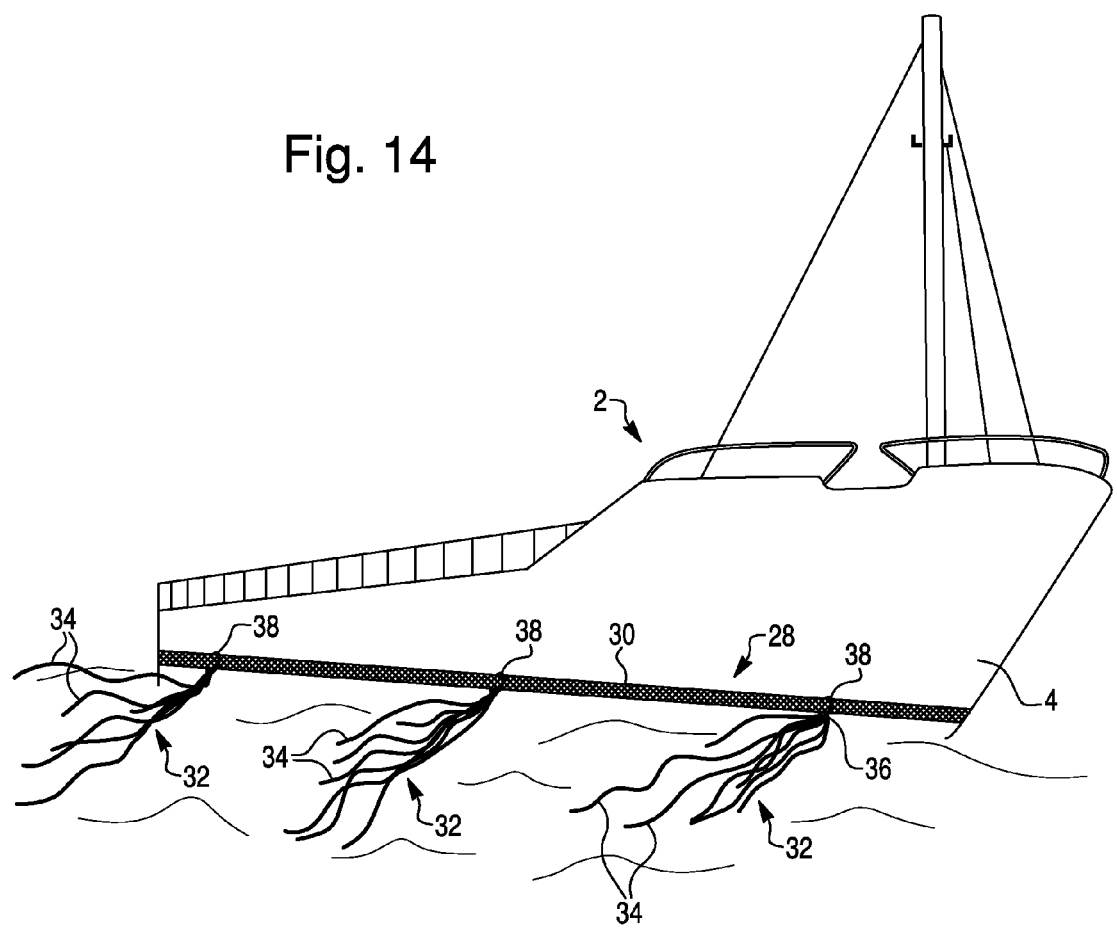
FIG. 14 shows an embodiment of an entanglement system deployed around a watercraft, according to the present invention.
Figure 15A:
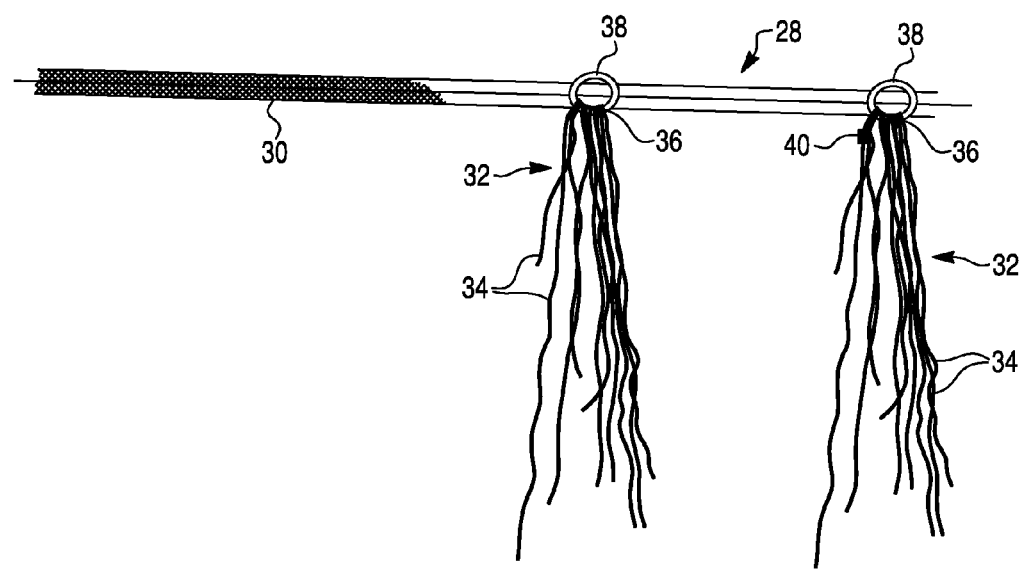
FIGS. 15A-15D show embodiments of an entanglement system.

FIGS. 14 and 15A show an embodiment of an entanglement system 28 for defending watercraft at sea and port. The system comprises a main cable 30 and at least one strand section 32. The system 28 is configured to protect watercraft by entangling the propellers of marine engines. As potential pirates approach the protected ship, their propellers become tangled with the strand section 32, stopping the engine. In addition, the system 28 may also jam the impellers of jet drive propulsion units.

Figure 15C:
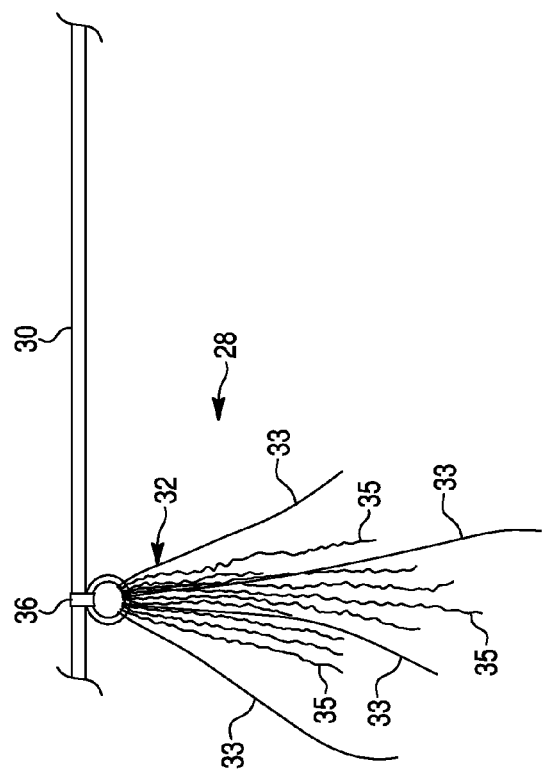
Figure 15D:
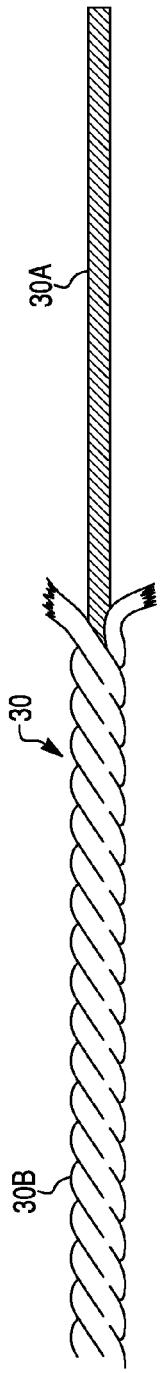
Figure 15B:
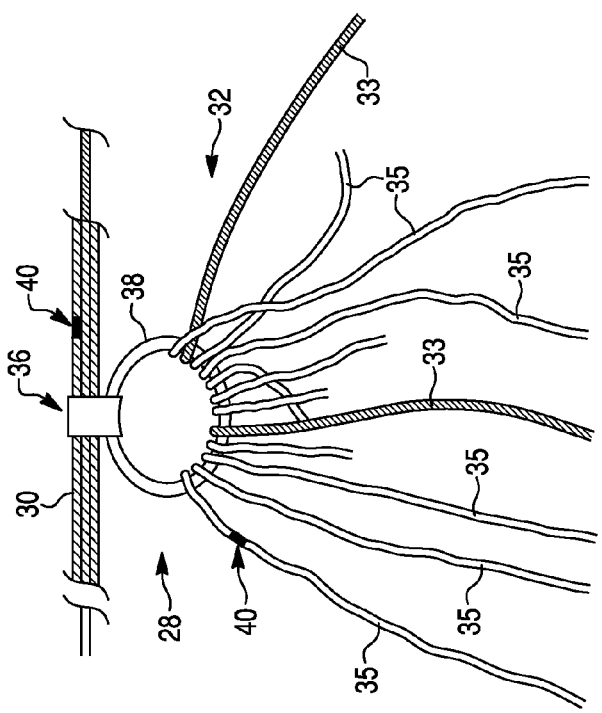

The strand section 32, such as shown in FIGS. 15A-15C, is comprised of a plurality of strands 34, a connector 36, and a link 38. Each strand section 32 comprises any number of strands 34. In a preferred embodiment, the strand section 32 comprises 52 strands. The strands 34 may be any length, and preferably the section 32 comprises a variety of different length strands 34. For example, the strands 34 may be approximately ten feet long. Alternatively, the strands 34 may be longer or shorter as appropriate. The strands 34 may be made of any type of material that will entangle propellers. It is preferable that the strands 34 float, and in a preferred embodiment they are made with polypropylene rope. For example, the strands 34 are made of hollow braid, solid braid or twisted polypropylene rope. If the strands 34 are a solid braid, the solid braid may contain polypropylene in combination with other materials, such as steel cable, Kevlar, polyethylene, nylon, composites, or any other suitable material.

In an embodiment, shown in FIGS. 15B-15C, the strand section 32 includes a steel cable 33 and unwound polypropylene strands 35 of varying and overlapping length. The strand sections 32 are configured to extend approximately six to eight inches under the water line 6.

The strands 34 may be looped around the link 38, which attaches the strand section 32 to the main cable 30. The link 38 can be a steel ring or any other suitable material capable of attaching the strand section 32 to the main cable 30. Each link 38 is connected to the main cable 30 by a connector 36. The connector 36 is preferably comprised of a material with a pre-engineered breaking strength. This feature allows strand section 32 to break away after it has become entangled in propellers, preserving the utility of any remaining sections.

In a preferred embodiment of the entanglement system 28, the strand sections 32 are equipped with a tracking device 40. This is useful to allow authorities to find potential pirates after their engines become entangled with the strand section 32. The tracking device may be, for example, a GPS or radio frequency operated tracking device, such as an RFID (radio frequency identification) chip 40, shown in FIGS. 15B-15C.

The main cable 30 can link a plurality of strand sections or bundles 32 together. The cable 30, such as shown in FIG. 15D, preferably comprises multiple materials. For example, the main cable 30 may comprise a steel cable core 30A wrapped with a polypropylene exterior 30B, such as a polypropylene twist rope. In another preferred embodiment, the main cable 30 may be equipped with buoys or similar devices to help it float.

Figure 20:
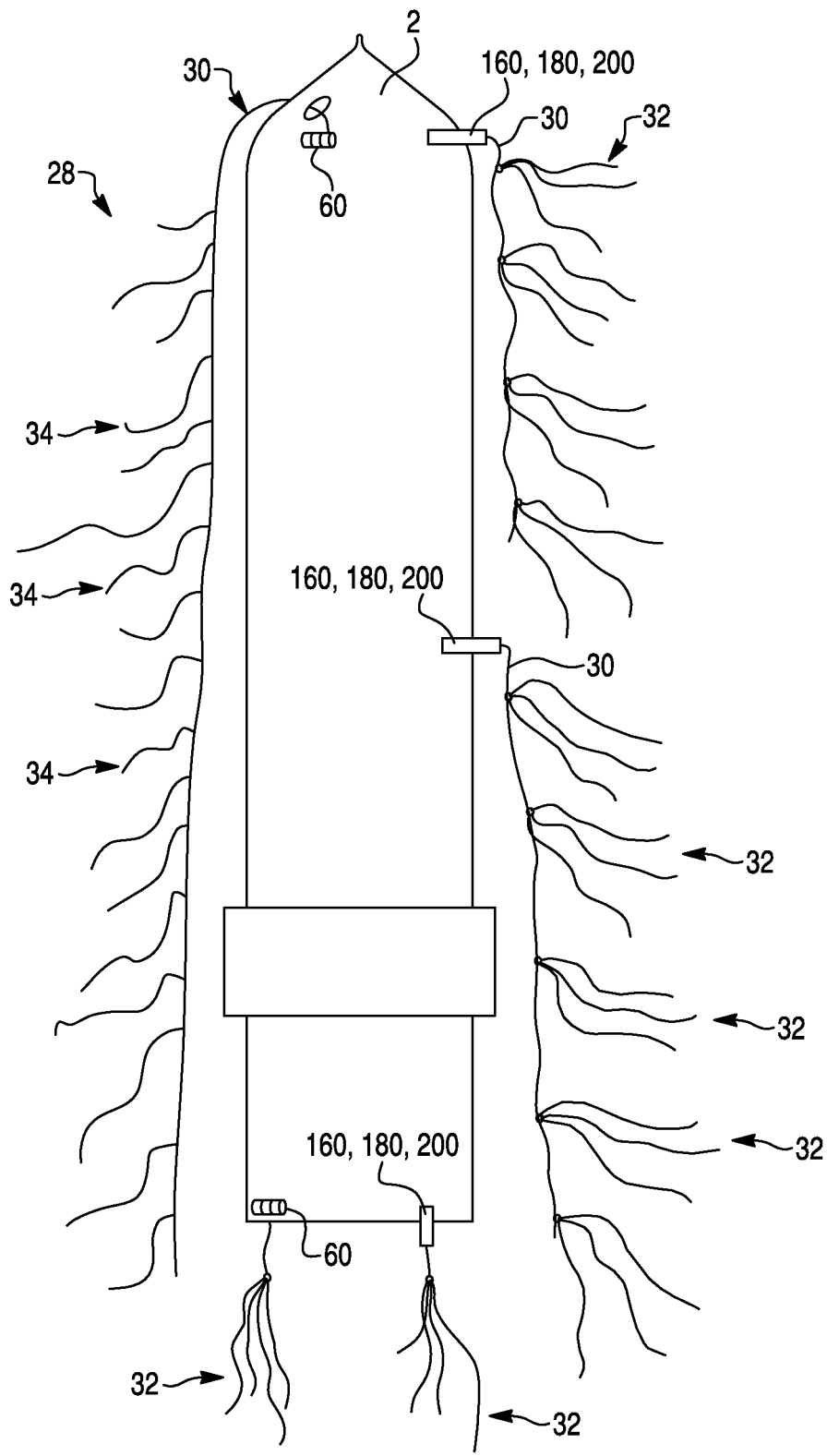
FIG. 20 is an illustration of a watercraft according to another embodiment in which a plurality of boom assemblies of a deployment system for an entanglement system are in use.

In another embodiment, the entanglement system 28 includes a main cable or line 30 with individual strands 34 attached to and extending out from the main cable 30, without bundled or sections that are grouped by links 38. Such a configuration of a main cable 30 and individual strands 34 is shown in FIG. 20. Alternatively, the entanglement system 28 may contain only one or more main lines 30, without bundles 32 of strands 34.

The entanglement system 28 is deployed around a watercraft 2. The entanglement system 28 may be deployed (e.g. placed in the water) in a variety of ways. For example, the ends of the main cable 30 may be attached to the hull 4, allowing the strand sections 32 to float in the water. Alternatively, the strand sections 32 may be pre-bundled into a tube-shaped carrier. When the carrier is thrown into the water, the force of the flow pushes the strands sections 32 out of the carrier and into the water. The entanglement system 28 may also extend between escort boats (with each end of the main cable 30 in a different boat) to create a barrier around the watercraft 2. In addition, the main cable may be attached to a boom, which can swing over the water and allow the strand sections 32 to spread out on the surface. Another method involves using a reel to deploy and rewrap the strand sections 32.

Figure 16A:
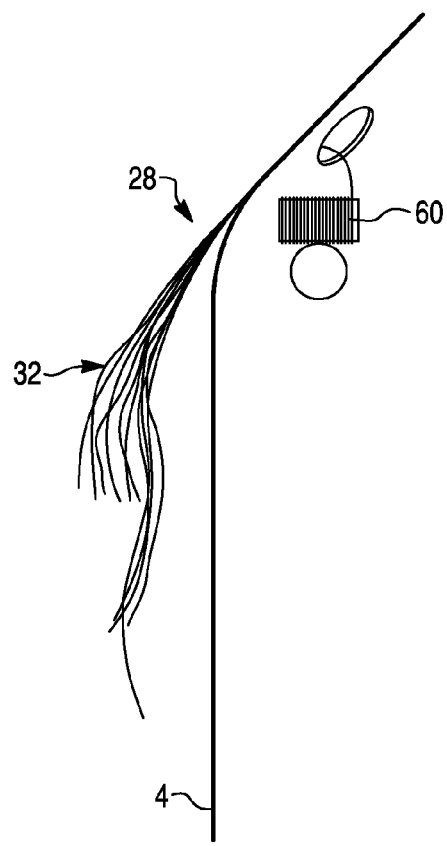
FIGS. 16A-16D illustrate exemplary embodiments of a deployment system for an entanglement system, according to the present invention.

FIGS. 16A-20 illustrate embodiments of deployment systems for the entanglement system 28. FIG. 16A illustrates an embodiment of the entanglement system 28. The entanglement system 28 is deployed through an anchor hawser via a drum 60. The entanglement system 28 is spooled out from the drum 60 to extend into the water. The deployed length of the entanglement system 28 can thus be adjusted as desired via the drum 60.

Figure 16B:
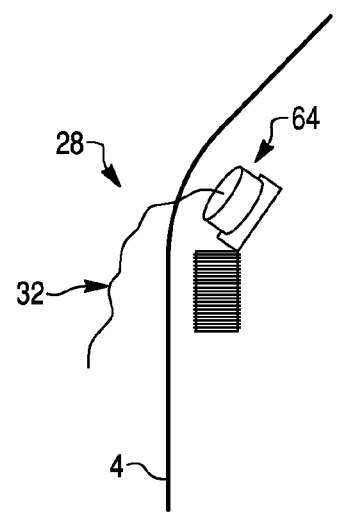

FIG. 16B illustrates another alternative in which the entanglement system 28 is deployed by a pneumatic device 64, spring-loaded, explosive-deployed, propellant-deployed, gravity-based, ballistic deployment, or mechanical platforms. Such deployment of the entanglement system 28 can facilitate quick entry of the entanglement system 28 into the water 10.

Figure 16C:
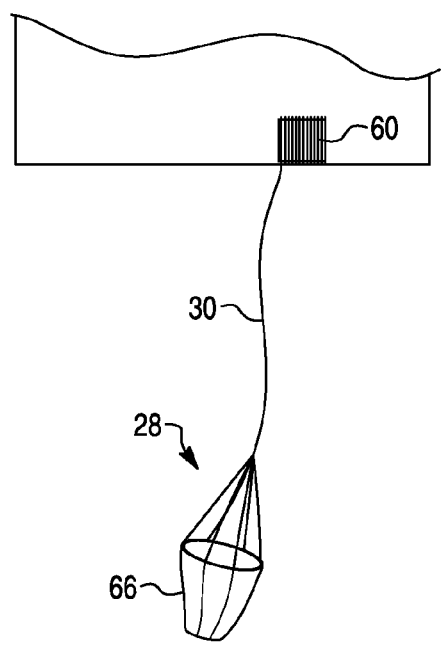

In yet another alternative shown in FIG. 16C, the entanglement system 28 is deployed off the stern with a sea anchor 66. The anchor 66 spools out the line or main cable 30 from a drum 60.

Figure 16D:
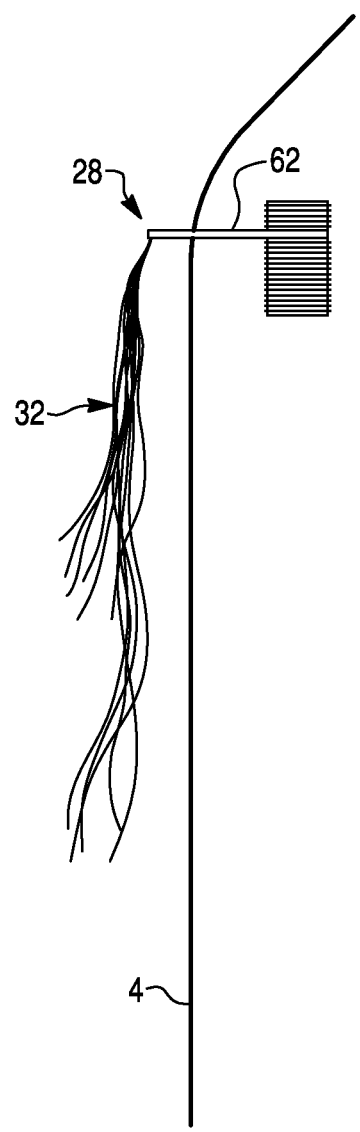

FIG. 16D illustrate an alternative of a deployment system in which the entanglement system 28 is deployed by a crane 62 or gaff extending over the side of the hull 4. FIGS. 17A-20 illustrate embodiments of deployment systems for the entanglement system 28 that utilize a boom.

FIG. 17A illustrates a deployment system with a telescoping boom assembly 160. The entanglement system 28 is deployed from a telescoping boom assembly 160 that is positioned along the deck 5 of the watercraft 2, preferably adjacent the bow of the watercraft 2. Although the boom assembly 160 is described as being telescoping, the boom assembly 160 may be, alternatively, fixed, folding, and/or assembled from several pieces.

The telescoping boom assembly 160 includes a rotating base 168, a sleeve 164 on the rotating base 168, main boom section 161 connected to the sleeve 164, and a telescoping boom section 162. The telescoping boom section 162 extends out from the main boom section 161 to a desired length. A guide ring 175 is attached to the telescoping boom section 162 at a distal end of the telescoping boom section 162.

The boom assembly 160 is configured to rotate forward and backwards in any manner known in the art. The boom assembly 160 is configured to stop rotating when the boom assembly 160 is approximately perpendicular to the hull 4 of the watercraft 2.

The rotating base 168 is attached to a backing plate 166 and a support 172 for attaching the boom assembly 160 to the watercraft 2. The backing plate 166, base 168, and support 172 are connected to the watercraft 2 by a clamp 170 and fastener 171 (screw, bolt, etc.). The clamp 170 and fastener 171 is connected to any suitable component of the watercraft 2. For example, the clamp 170 and fastener 171 may be connected to a tow rail 3, such that the clamp 170 sandwiches the tow rail 3 between either side of the clamp 170. The clamp 170 is held in place by one or more of the fasteners 171.

Alternatively, the clamp 170 may be connected to scuppers, a plate on the deck 5 of the watercraft 2 that is bolted to preexisting davit cleats, or any other suitable component.

A single main line or cable 30 of the entanglement system 28 extends from the boom 160. One end (a first end) of the main cable 30 of the entanglement system 28 is attached to the backing plate 166 or other component on the deck 5 of the watercraft 2. The main cable 30 is threaded through the guide ring 175. In order to deploy the entanglement system, one would merely toss over a few feet of a second end of the main cable 30 over the deck 5 of the watercraft 2, rotate the boom assembly 160, and the remainder of the main cable 30 and entanglement system 28 would be dragged out to sea to be deployed. In such a configuration, a person deploying the entanglement system 28 could remain behind a safety rail of the watercraft 2. In such an embodiment, the entanglement system 28 has a fixed length. Alternatively, the entanglement system 28 is distributed out from a reel to adjust the length of the main cable 30 (such as shown in FIG. 16A). The above descriptions of deployment are exemplary only. The entanglement system 28 may be deployed in any other suitable manner or in any other suitable order.

Figure 17B:
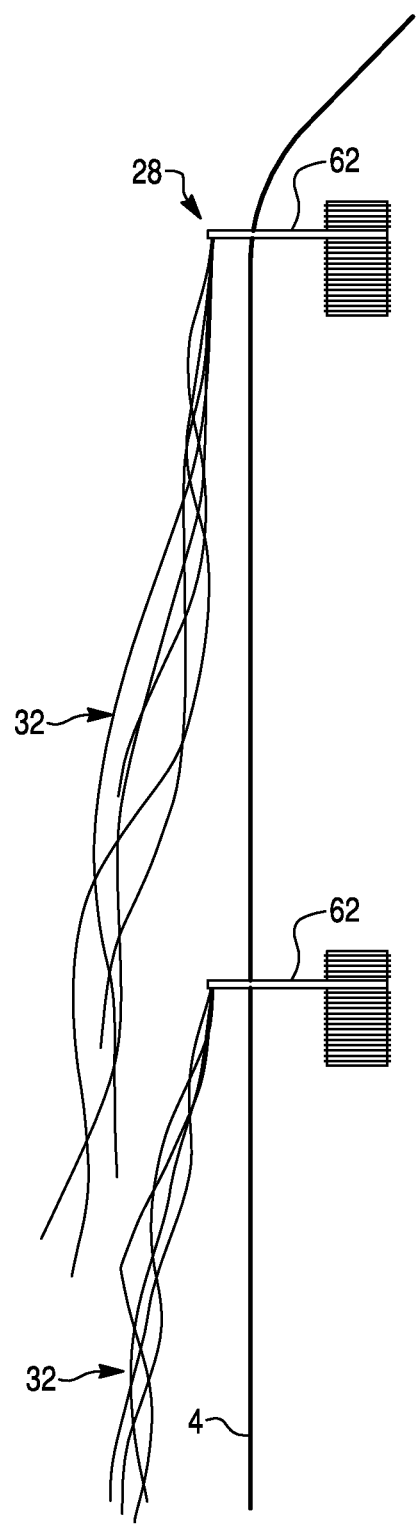
FIG. 17B illustrates an entanglement system deployed from multiple points along a watercraft's length.
Figure 21:
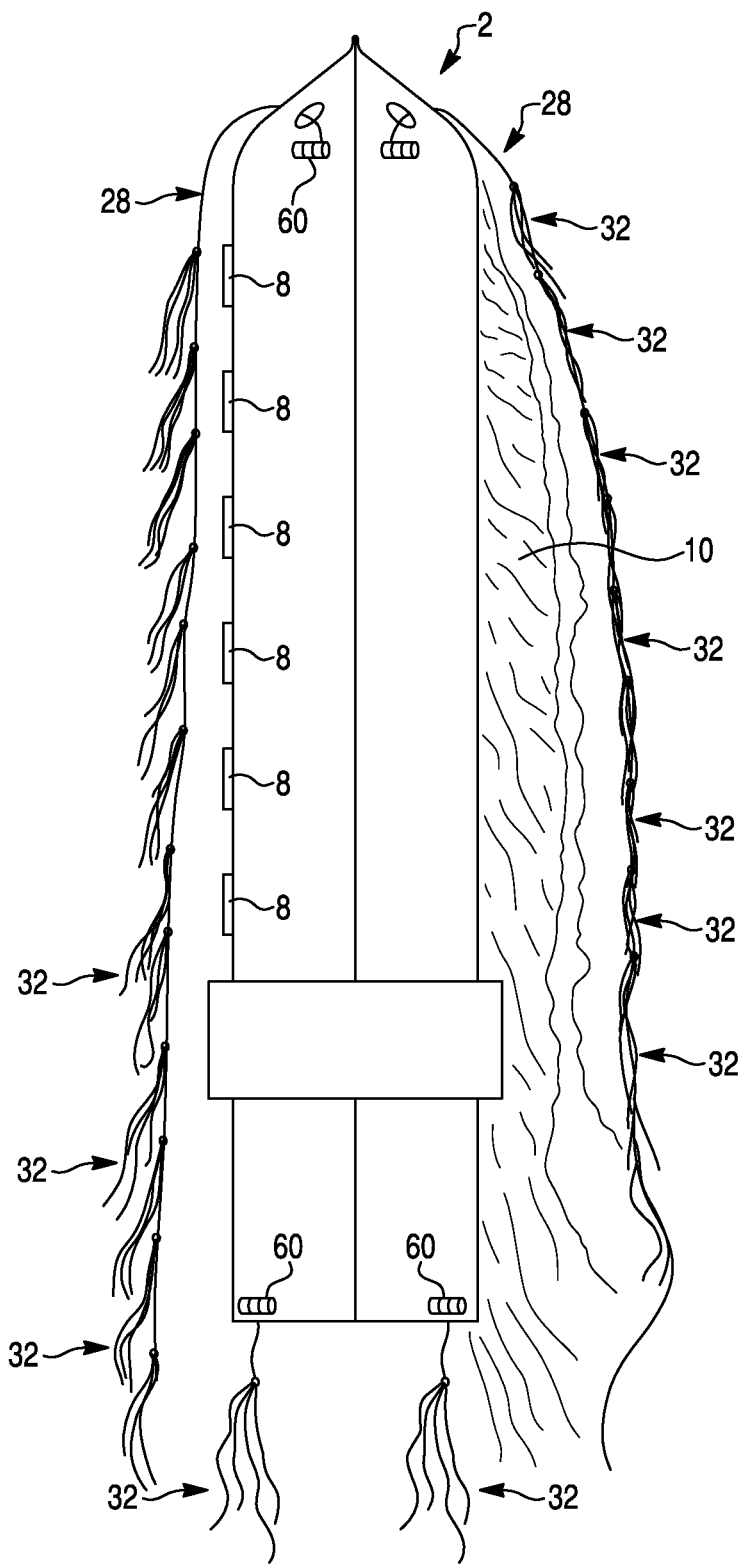
FIG. 21 is an illustration of a watercraft according to another embodiment in which a water diverter and entanglement system are in use; a left side of the watercraft illustrating a plurality of water diverters and entanglement system prior to a wave; and the right side of the watercraft illustrating waves created by the water diverters.

The main cable or line 30 can include a plurality of bundles 32. The main cable 30 can extend for the entire length of the watercraft 2, from the bow to the stern. Alternatively, the main cable 30 can extend for a shorter portion of the length of the watercraft 2. In such a configuration, multiple booms 160 can be used so that the entire length of the watercraft 2 can be protected, such as shown in FIGS. 17B and 20. The deployment system of FIG. 17B shows the watercraft 2 having a plurality of deployment locations for the entanglement system 28. The booms (cranes, gaffs, or davits) 160 can be spaced at intervals along the sides of the watercraft 2. The main cables 30 and strands 34 can overlap each other to create a full line of coverage fro the watercraft 2. In addition, one or more main cables 30 can be deployed from the stern of the watercraft 2, such as shown in FIGS. 20 and 21.

FIG. 18 illustrates another embodiment of a deployment system with a boom assembly. In FIG. 18, a davit boom assembly 180 is shown. The davit boom assembly 180 utilizes a watercraft's davit or crane to deploy the entanglement system 28. In an exemplary embodiment, hollow (tube) or solid boom 190 is attached to a pre-existing boom 182 on the deck 5 of the watercraft 2. The boom 190 is connected to the davit or crane 182 by clamp attachments 184. The main cable 30 of the entanglement system 28 can be positioned inside the hollow boom 190 and extend out of a distal end of the boom 190 to be deployed in the water 10. The main cable 30 can be fixed, at a proximal end, to the boom 182, 190, davit, deck 5, or other component of the watercraft 2, while the distal end of the main line 30 is deployed in the water 10. In such an embodiment, the entanglement system 28 is deployed from the davit boom assembly 180, which extends from a height above the deck 5. Such a placement may further inhibit boarding from unwanted persons via the entanglement system.

FIG. 19 illustrates another embodiment of a deployment system with a boom assembly. In FIG. 19, a mounted boom assembly 200 is shown. The boom assembly 200 comprises a boom component 210 that is mounted to the hull 4, deck 5, or any other component of the watercraft 2 via attachment plates 204. For example, the attachment plates 204 can be welded to rails 3 of the watercraft 2. The boom component 210 may be further supported by a support component 202 that is also attached to the hull 4, deck 5, or any other component of the watercraft 2. The support component 202 may be a cable, a solid component, or any other suitable support.

The boom 210 includes one or more drag attachments 212. The main line 30 of the entanglement system 28 can be connected to a drag attachment 212. In the embodiment shown, multiple main lines 30 can be connected to the boom 210; one main line 30 for each drag attachment 210. Any suitable number of drag attachments 212 and main lines 30 may be used. The plurality of main lines 30 hang in parallel and create multiple lines of protection for the watercraft 2.

Alternatively, any other embodiment of a boom, crane, or gaff can include multiple cables 30 (with strands 34 and/or sections 32) suspended in parallel to create multiple lines of protection. Such an arrangement can be combined with additional entanglement systems 28 deployed from single or multiple locations along the watercraft 2.

III. The Defense System for Watercraft

The entanglement system 28 may also be used in conjunction with the water diverter 8 on the watercraft 2, such as shown in FIG. 21. The water diverter 8 creates a wave that can help to spread out the strands 34 of the entanglement system 28. In this preferred embodiment, the entanglement system 28 fans out over a greater area of the water and is therefore better able to stop small vessels from approaching the protected watercraft 2. The combination of the diverter 8 and the entanglement system 28 provides both a deterrent and a physical barrier around the watercraft 2. In FIG. 21, the left side of the drawing illustrates the entanglement system 28 and diverters 8 prior to generation of a wave. The right side of FIG. 21 illustrates the entanglement system 28 and waves generated by the diverters 8.

Figure 22:
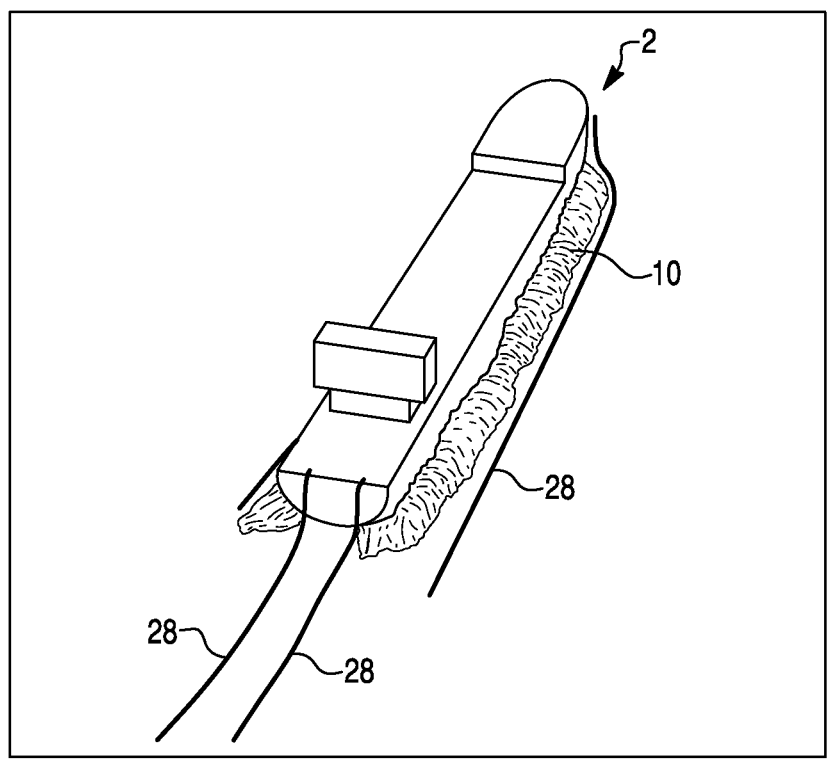
FIG. 22 is a photograph of a watercraft according to an embodiment, in which a diverter system and entanglement system are used.

FIG. 22 is an illustration of a watercraft 2 with a water diverter 8 and an entanglement system 28 in use. A white wave 10 is shown as an illustrative example of the wave produced by the water diverter 8. The strands 34 of the entanglement system 28 are also shown trailing along and behind the watercraft 2.

FIGS. 23A-25 illustrate another embodiment of a watercraft 2 with a water diverter 8 and an entanglement system 28. When the watercraft 2 is stationary, the water diverter 8 may utilize a water delivery device, such as a water hose, to create a surface current that will carry the entanglement system 28 outward from the hull 4 of the watercraft 2 to the distance required to protect the watercraft 2. This embodiment need not utilize the first deflector 12.

Figure 23A:
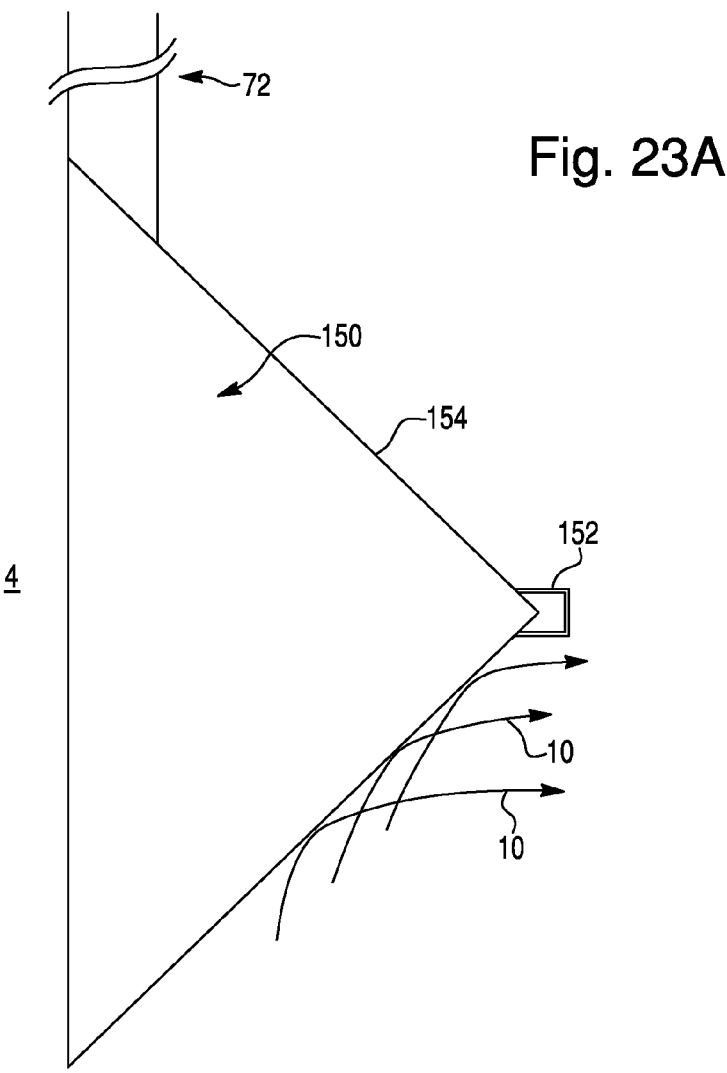
FIG. 23A is a front or aft view of a second deflector and water hose connector on a hull of a watercraft according to an embodiment.
Figure 23B:
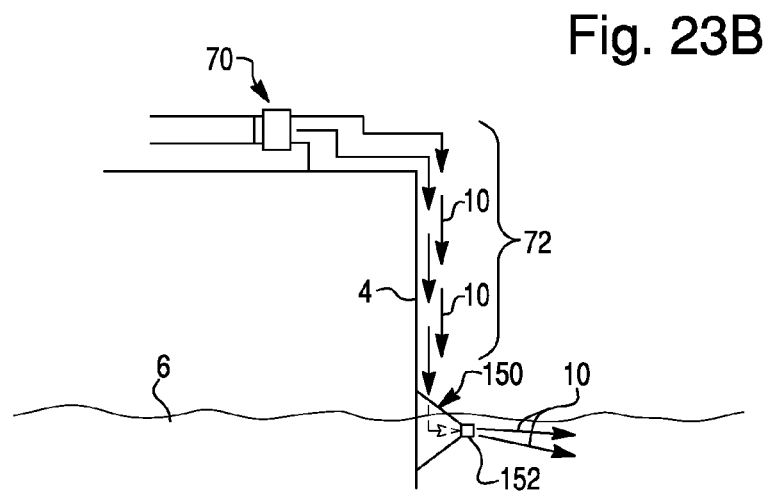
FIG. 23B is an illustration of the hull of the watercraft with the second deflector and water hose according to FIG. 20A.
Figure 25:
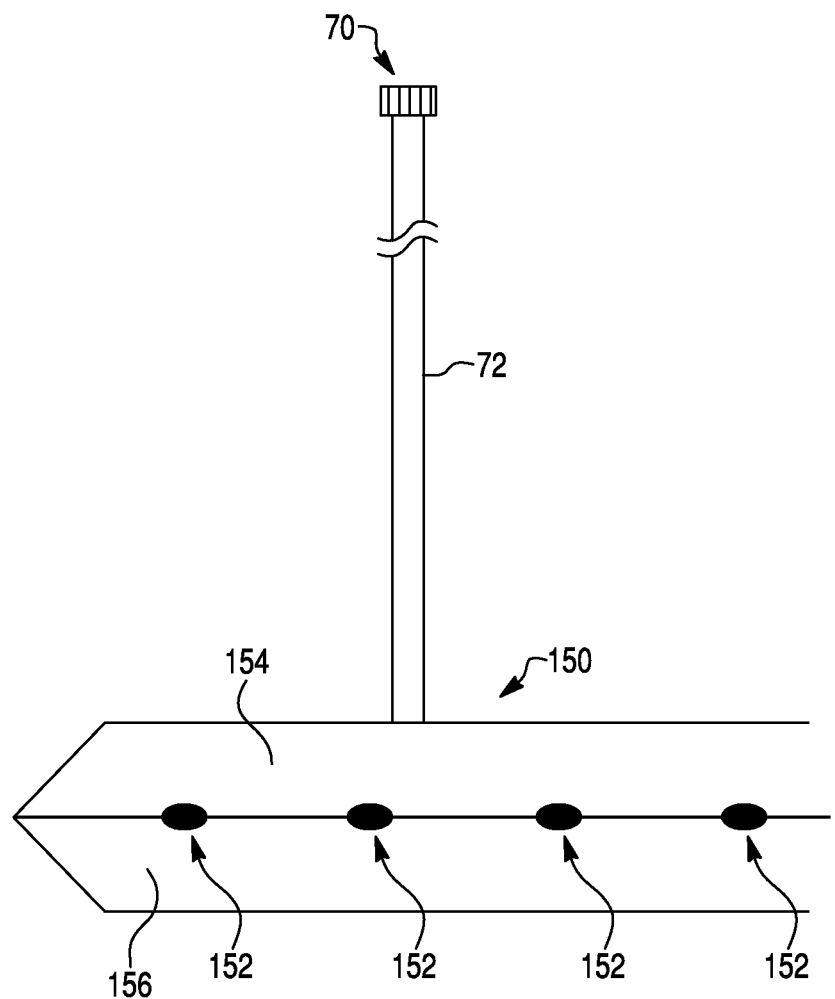
FIG. 25 is an illustration of the fire hose and water delivery tube for the second deflector according to an embodiment.

The water delivery device may be disposed on the second deflector 150. As shown in FIG. 23A, the second deflector 150 can include a top surface 154 and a bottom surface 156. Vents 152 are provided on the second deflector 150 along the center edge joining the top surface 154 and bottom surface 156. As shown in FIGS. 23B and 25, a water delivery tube 72 is extended down along the hull 4 and into the second deflector 150 so that water will exit the water delivery tube 72 into the second deflector 150 and then exit the second deflector 150 via the vents 152. The second deflector 150 is arranged so that the vents 152 are below the water line 6. The vents 152 direct water outward from the hull 4 to create a water current extending out from the hull 4. The watercraft 2 may include any suitable number of second deflectors 150.

The water delivery tube 72 can be connected on the watercraft 2 to a fire hose coupling 70 (or any other suitable water supply). The watercraft 2 includes at least one fire hose coupling 70 and related water delivery tube 72. Preferably, the watercraft 2 includes multiple water delivery tubes 72 and couplings 70 along the length of the watercraft 2. The coupling 70 is specific to the watercraft's 2 equipment and specific water supply used and allows the water delivery tube 72 to connect to the second deflector 150 and direct water into the second deflector 150 to create the water current.

Figure 24A:
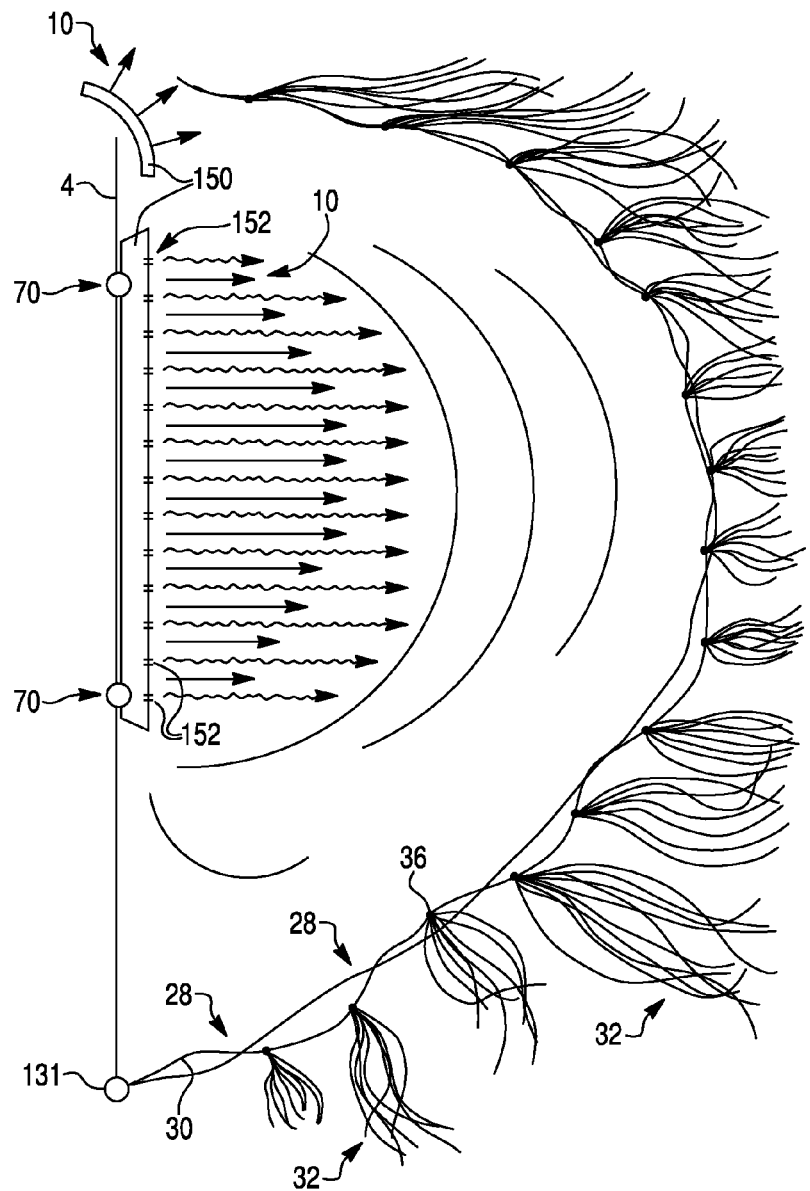
FIG. 24A is an illustration of a watercraft according to another embodiment in which a water diverter and entanglement system are in use.
Figure 24B:
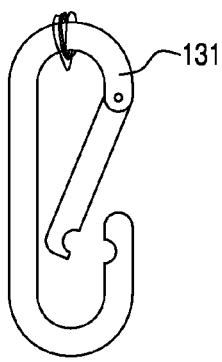
FIG. 24B is an illustration of a carabiner according to FIG. 24A.

The water current created by the water delivery tube 72 and second deflector 150 will carry the entanglement system 28 outward from the hull 4. The entanglement system 28 may extend a preset distance from the watercraft 2 by connecting to a component deployed from the watercraft 2. The entanglement system 28 may be connected to the watercraft 2 in any suitable manner. For example, such as shown in FIG. 24A, the cable or rope 30 of the entanglement system 28 may be clipped to a carabiner 131 (FIG. 24B) to connect to the watercraft 2.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A watercraft comprising:
   a hull; and
   a water diverter configured to direct water upward and outward from the hull of the watercraft to create a wave, wherein the water diverter includes:
      at least one first deflector configured to direct water upward;
      a support structure for holding the at least one first deflector, wherein the support structure comprises a shell including a hollow tube for directing water, the hollow tube having at least one opening for the intake of water and at least one vent to allow water to exit the shell in an upward direction; and
      a second deflector positioned above the first deflector, wherein the second deflector is configured to deflect the water from the first deflector outward from the watercraft to form a wave, wherein the second deflector has a triangular cross-section, with a top surface positioned to angle downward from the watercraft.

2. The watercraft of claim 1, wherein the at least one first deflector comprises at least one of a planar surface and a curved surface for directing water.

3. The watercraft of claim 1, wherein the support structure is one of fixedly and moveably connected to the hull.

4. The watercraft of claim 1, wherein at least a portion of the shell is cambered towards the hull to assist intake flow.

5. The watercraft of claim 1, further comprising:
   a plurality of vents;
   wherein the plurality of vents lie in substantially the same plane.

6. The watercraft of claim 1, further comprising:
   a plurality of vents;
   wherein the plurality of vents lie in different planes to create a step-down system.

7. The watercraft of claim 1, further comprising:
   a moving structure for moving the at least one first deflector into a deflecting position.

8. The watercraft of claim 7, wherein the moving structure is configured to move the support structure and the at least one first deflector relative to the hull and into and out of a deflecting position.

9. The watercraft of claim 7, wherein the moving structure is configured to move the at least one first deflector relative to the support structure and into and out of a deflecting position.

10. The watercraft of claim 1, further comprising:
    at least one second deflector positioned above the at least one first deflector, the at least one second deflector configured to deflect the water from the at least one first deflector outward from the hull to form a wave.

11. The watercraft of claim 1, further comprising teeth that project from an outer edge of the shell.

12. The watercraft of claim 1, wherein the first deflector is positioned below the vent such that the first deflector deflects water upward through the vent.

13. The watercraft of claim 1, wherein the hollow tube has a rectangular cross-section.

14. The watercraft of claim 1, further comprising teeth that project from an outer edge of the second deflector.

15. The watercraft of claim 1, wherein the second deflector is positioned above the vent.

16. The watercraft of claim 1, wherein the support structure is configured to hold the at least one first deflector and the second deflector, wherein the support structure is configured to hold the first deflector and the second deflector such that the first deflector and the second deflector are moveable relative to each other.

17. An entanglement system for defending watercraft, comprising:
    a main cable configured to be attached to a watercraft; and
    at least one strand section attached to the main cable;
    wherein the at least one strand section includes a plurality of strands attached to the main cable, wherein a first end of each of the plurality of strands is attached to the main cable and a second end of each of the plurality of strands is a free end; and
    wherein the main cable and strand section are configured to be deployed into water surrounding the first watercraft to ensnare a propeller of a second watercraft, and
    wherein the at least one strand section includes a tracking device.

18. The entanglement system of claim 17, wherein the plurality of strands comprise strands of a variety of lengths.

19. The entanglement system of claim 17, wherein the strands comprise polypropylene rope.

20. The entanglement system of claim 17, wherein the tracking device is an RFID chip.

* * * * *